US008843617B2

(12) United States Patent
Kuindersma et al.

(10) Patent No.: US 8,843,617 B2
(45) Date of Patent: Sep. 23, 2014

(54) MULTI-STAGE POLLING MECHANISM AND SYSTEM FOR THE TRANSMISSION AND PROCESSING CONTROL OF NETWORK RESOURCE DATA

(75) Inventors: Michael Kuindersma, Conestoga (CA); Michael St. Laurent, Baden (CA); Mark Onischke, Kitchener (CA)

(73) Assignee: PrinterOn Inc., Kitchener (CA)

( * ) Notice: Subject to any disclaimer, the term of this patent is extended or adjusted under 35 U.S.C. 154(b) by 355 days.

(21) Appl. No.: 12/884,768

(22) Filed: Sep. 17, 2010

(65) Prior Publication Data

US 2011/0209211 A1   Aug. 25, 2011

Related U.S. Application Data

(63) Continuation-in-part of application No. 09/926,436, filed as application No. PCT/CA01/00235 on Mar. 1, 2001, now Pat. No. 7,827,293.

(30) Foreign Application Priority Data

Mar. 1, 2000   (CA) ...................................... 2299824

(51) Int. Cl.
*H04L 12/24*   (2006.01)
*H04L 29/08*   (2006.01)
*G06F 3/12*   (2006.01)
*H04L 29/06*   (2006.01)

(52) U.S. Cl.
CPC .............. *H04L 41/28* (2013.01); *G06F 3/1238* (2013.01); *G06F 3/1225* (2013.01); *G06F 3/1222* (2013.01); *G06F 3/1288* (2013.01); *H04L 63/0209* (2013.01); *H04L 67/16* (2013.01)
USPC ....................................................... 709/224

(58) Field of Classification Search
None
See application file for complete search history.

(56) References Cited

U.S. PATENT DOCUMENTS 5,220,674 A   6/1993   Morgan et al.
(Continued)

FOREIGN PATENT DOCUMENTS

CA   2401738 A1   9/2001
EP   1170920   1/2002
(Continued)

OTHER PUBLICATIONS

International Search Report, PCT Application No. PCT/CA2011/000994, mailed Dec. 1, 2011 (3 pages).
(Continued)

*Primary Examiner* — Hassan Phillips
*Assistant Examiner* — Omeed D Rahgozar
(74) *Attorney, Agent, or Firm* — Occhiuti & Rohlicek LLP

(57) ABSTRACT

A method and corresponding system for coordinating submission of network resource data across a first network to a network resource located on a second network, the second network being coupled to the first network by a firewall such that the second network has a higher level of trust than that of the first network, the method comprising the steps of: receiving and storing in a storage the network resource data submitted by a network terminal coupled to the first network, the network resource data containing a network resource identifier for associating the network resource data with the network resource; receiving and storing in the storage control data associated with the network resource data, the control data for coordinating one or more actions on the network resource data; receiving a first poll message initiated through the firewall by a polling server located on the second network, the first poll message requesting stored network resource data containing the network resource identifier and forwarding the network resource data matching the network resource identifier to the polling server; and receiving a second poll message initiated through the firewall by the polling server, the second poll message requesting stored data matching the control data associated with the network resource data and forwarding the matched control data to the polling server.

20 Claims, 11 Drawing Sheets

(56) References Cited

U.S. PATENT DOCUMENTS

| | | | |
|---|---|---|---|
| 5,580,177 A | 12/1996 | Gase et al. |
| 5,696,898 A | 12/1997 | Baker et al. |
| 5,727,159 A | 3/1998 | Kikinis |
| 5,764,235 A | 6/1998 | Hunt et al. |
| 5,825,759 A | 10/1998 | Liu |
| 5,826,062 A | 10/1998 | Fake et al. |
| 5,872,926 A | 2/1999 | Levac et al. |
| 5,903,723 A | 5/1999 | Beck et al. |
| 5,958,006 A | 9/1999 | Eggleston et al. |
| 5,987,611 A | 11/1999 | Freund |
| 6,049,711 A | 4/2000 | Ben-Yehezkel et al. |
| 6,064,656 A | 5/2000 | Angal et al. |
| 6,085,227 A | 7/2000 | Edlund et al. |
| 6,088,451 A | 7/2000 | He et al. |
| 6,092,114 A | 7/2000 | Shaffer et al. |
| 6,128,644 A | 10/2000 | Nozaki |
| 6,138,162 A * | 10/2000 | Pistriotto et al. ............ 709/229 |
| 6,148,336 A | 11/2000 | Thomas et al. |
| 6,151,624 A | 11/2000 | Teare et al. |
| 6,161,139 A | 12/2000 | Win et al. |
| 6,178,505 B1 | 1/2001 | Schneider et al. |
| 6,182,142 B1 | 1/2001 | Win et al. |
| 6,202,156 B1 | 3/2001 | Kalajan |
| 6,212,565 B1 | 4/2001 | Gupta |
| 6,219,786 B1 | 4/2001 | Cunningham et al. |
| 6,226,752 B1 | 5/2001 | Gupta et al. |
| 6,233,618 B1 | 5/2001 | Shannon |
| 6,308,273 B1 | 10/2001 | Goertzel et al. |
| 6,317,838 B1 | 11/2001 | Baize |
| 6,324,648 B1 * | 11/2001 | Grantges, Jr. ............... 726/12 |
| 6,336,124 B1 | 1/2002 | Alam et al. |
| 6,345,288 B1 | 2/2002 | Reed et al. |
| 6,345,300 B1 | 2/2002 | Bakshi et al. |
| 6,349,336 B1 | 2/2002 | Sit et al. |
| 6,360,252 B1 | 3/2002 | Rudy et al. |
| 6,377,994 B1 | 4/2002 | Ault et al. |
| 6,408,336 B1 | 6/2002 | Schneider et al. |
| 6,438,585 B2 | 8/2002 | Mousseau et al. |
| 6,442,541 B1 | 8/2002 | Clark et al. |
| 6,445,824 B2 | 9/2002 | Hieda |
| 6,453,353 B1 | 9/2002 | Win et al. |
| 6,457,030 B1 | 9/2002 | Adams et al. |
| 6,463,474 B1 | 10/2002 | Fuh et al. |
| 6,490,624 B1 | 12/2002 | Sampson et al. |
| 6,510,464 B1 | 1/2003 | Grantges et al. |
| 6,513,061 B1 | 1/2003 | Ebata et al. |
| 6,542,892 B1 | 4/2003 | Cantwell |
| 6,549,949 B1 | 4/2003 | Bowman-Amuah |
| 6,553,422 B1 | 4/2003 | Nelson |
| 6,581,092 B1 | 6/2003 | Motoyama et al. |
| 6,598,076 B1 | 7/2003 | Chang et al. |
| 6,601,108 B1 | 7/2003 | Marmor |
| 6,604,143 B1 | 8/2003 | Nagar et al. |
| 6,606,660 B1 | 8/2003 | Bowman-Amuah |
| 6,606,708 B1 | 8/2003 | Devine et al. |
| 6,615,234 B1 | 9/2003 | Adamske et al. |
| 6,662,228 B1 | 12/2003 | Limsico |
| 6,681,392 B1 | 1/2004 | Henry et al. |
| 6,687,732 B1 | 2/2004 | Bector et al. |
| 6,690,481 B1 | 2/2004 | Yeung et al. |
| 6,704,798 B1 | 3/2004 | Mogul |
| 6,708,220 B1 | 3/2004 | Olin |
| 6,718,328 B1 | 4/2004 | Norris |
| 6,728,787 B1 | 4/2004 | Leigh |
| 6,742,039 B1 | 5/2004 | Remer et al. |
| 6,771,595 B1 | 8/2004 | Gilbert et al. |
| 6,785,728 B1 | 8/2004 | Schneider et al. |
| 6,829,646 B1 | 12/2004 | Philyaw et al. |
| 6,885,860 B2 | 4/2005 | Bahl et al. |
| 6,925,595 B1 | 8/2005 | Whitledge et al. |
| 6,978,299 B1 | 12/2005 | Lodwick |
| 6,981,045 B1 | 12/2005 | Brooks |
| 7,037,198 B2 | 5/2006 | Hameen-Anttila |
| 7,249,188 B2 | 7/2007 | Spicer et al. |
| 7,904,594 B2 | 3/2011 | Spicer et al. |
| 8,493,591 B2 | 7/2013 | Kitagata |
| 2001/0044829 A1 | 11/2001 | Lundberg |
| 2002/0016818 A1 | 2/2002 | Kirani et al. |
| 2002/0066026 A1 | 5/2002 | Yau et al. |
| 2002/0122201 A1 | 9/2002 | Haraguchi |
| 2002/0143773 A1 | 10/2002 | Spicer et al. |
| 2002/0155843 A1 | 10/2002 | Bahl et al. |
| 2003/0037126 A1 | 2/2003 | Spicer et al. |
| 2003/0051038 A1 * | 3/2003 | Spicer et al. ............... 709/229 |
| 2003/0078965 A1 | 4/2003 | Cocotis et al. |
| 2003/0079030 A1 * | 4/2003 | Cocotis et al. ............. 709/229 |
| 2003/0090694 A1 | 5/2003 | Kennedy et al. |
| 2003/0103226 A1 | 6/2003 | Nishio |
| 2003/0191676 A1 | 10/2003 | Templeton |
| 2003/0197887 A1 | 10/2003 | Shenoy et al. |
| 2004/0125401 A1 | 7/2004 | Earl et al. |
| 2004/0190049 A1 | 9/2004 | Itoh |
| 2004/0252337 A1 | 12/2004 | Takabayashi et al. |
| 2005/0085241 A1 | 4/2005 | Bahl et al. |
| 2005/0255861 A1 | 11/2005 | Wilson et al. |
| 2006/0168258 A1 * | 7/2006 | Spicer et al. ............... 709/229 |
| 2007/0234354 A1 | 10/2007 | Hattori |
| 2008/0184162 A1 | 7/2008 | Lindsey et al. |
| 2008/0193182 A1 | 8/2008 | Sasama |
| 2008/0246988 A1 | 10/2008 | Ashton |
| 2010/0094979 A1 | 4/2010 | Azami |
| 2010/0095367 A1 * | 4/2010 | Narayanaswamy ............ 726/12 |
| 2010/0103453 A1 | 4/2010 | Tsutsumi |

FOREIGN PATENT DOCUMENTS

| | | |
|---|---|---|
| EP | 1271302 A2 | 1/2003 |
| EP | 1435565 | 7/2004 |
| EP | 1460529 | 9/2004 |
| WO | 9836344 | 8/1998 |
| WO | 9840992 | 9/1998 |
| WO | 9922294 | 5/1999 |
| WO | 9965256 | 12/1999 |
| WO | 0011850 | 3/2000 |
| WO | 0122259 | 3/2001 |
| WO | 03019403 A2 | 3/2003 |

OTHER PUBLICATIONS

Extended European Search Report dated Feb. 4, 2014 issued from the European Patent Office relating to European Patent Application No. 11824385.6.

Extended European Search Report dated Feb. 5, 2014 issued from the European Patent Office relating to European Patent Application No. 11824383.1.

Liljeberg M. et al., "Enhanced Services for World-Wide Web in Mobile WAN Environment", Apr. 1, 1996, University of Helsinki, Department of Computer Science, Publication No. C-1996-28, Helsinki, Finland, XP002162553.

Zenel B. et al., "Intelligent Communication Filtering for Limited Bandwidth Environments", Workshop on Hot Topics in Operating Systems, May 4, 1995, pp. 28-34, XP002094011, p. 28, line 12-p. 34, line 11.

Australian Examination Report dated May 25, 2005 issued from the Australian Patent Office relating to Australian Patent Application No. 2001243980.

Canadian Office Action dated Aug. 7, 2012 issued from the Canadian Intellectual Property Office relating to Canadian Patent Application No. 2,301,996.

Canadian Office Action dated Jan. 5, 2011 issued from the Canadian Intellectual Property Office relating to Canadian Patent Application No. 2,301,996.

Canadian Office Action dated Jul. 16, 2008 issued from the Canadian Intellectual Property Office relating to Canadian Patent Application No. 2,301,996.

Sitao W. et al.: "Using Device Driver Software in Scada Systems" 2000 IEEE Power Engineering Society. Winter Meeting Conference Proceedings. Singapore, Ja 23-27, 2000, IEEE Power Engineering Society Winder Meeting, New York, NY: right-hand column, paragraph 3, p. 2047, right-hand column, paragraph 1.

(56) References Cited

OTHER PUBLICATIONS

Qi Lu et al., "Efficient large-scale access control for Internet/intranet information systems", System Sciences, Proceedings of the 32nd Annual Hawaii International Conference on Volume, Jan. 5-8, 1999, pp. 9pp.

Hiltunen et al., "Access control in wide-area networks", Distributed Computing Systems, Proceedings of the 17th International Conference, May 27-30, 1997 pp. 330-337.

Johnston et al., "Authorization and attribute certificates for widely distributed access control", Enabling Technologies: Infrastructure for Collaborative Enterprises, Proceedings, Seventh IEEE International Workshops, Jun. 17-19, 1998, pp. 340-345.

Kumar et al., "Security management architecture for access control to network resources", Computers and Digital Techniques, IEE Proceedings—vol. 144, Issue 6, Nov. 1997, pp. 362-370.

International Search Report, PCT Application No. PCT/CA2011/000991 dated Dec. 19, 2011.

International Search Report, PCT Application No. PCT/CA2011/000994 dated Dec. 1, 2011.

Extended European Search Report dated Jan. 23, 2014 relating to European Patent Application No. 11824384.9.

Canadian Office Action dated Jul. 30, 2009 issued from the Canadian Intellectual Property Office relating to Canadian Patent Application No. 2,401,738.

Canadian Office Action dated Nov. 27, 2007 issued from the Canadian Intellectual Property Office relating to Canadian Patent Application No. 2,401,738.

Canadian Office Action dated Apr. 28, 2009 issued from the Canadian Intellectual Property Office relating to Canadian Patent Application No. 2,401,717.

Canadian Office Action dated Sep. 21, 2007 issued from the Canadian Intellectual Property Office relating to Canadian Patent Application No. 2,401,717.

Canadian Office Action dated Apr. 24, 2007 issued from the Canadian Intellectual Property Office relating to Canadian Patent Application No. 2,401,729.

Canadian Office Action dated Aug. 13, 2009 issued from the Canadian Intellectual Property Office relating to Canadian Patent Application No. 2,401,721.

Canadian Office Action dated Nov. 21, 2007 issued from the Canadian Intellectual Property Office relating to Canadian Patent Application No. 2,401,721.

Extended European Search Report dated May 13, 2011 relating to European Patent Application No. 10011973.4.

European Examination Report dated Feb. 26, 2013 relating to European Patent Application No. 10011973.4.

International Search Report, PCT Application No. PCT/CA2011/000992.

International Search Report, PCT Application No. PCT/CA2011/000993.

International Search Report, PCT Application No. PCT/CA2011/000995.

International Search Report, PCT Application No. PCT/CA2011/001295.

\* cited by examiner

MULTI-STAGE POLLING MECHANISM AND SYSTEM FOR THE TRANSMISSION AND PROCESSING CONTROL OF NETWORK RESOURCE DATA

CROSS-REFERENCE TO RELATED APPLICATIONS

This application is a Continuation-in-Part of U.S. application Ser. No. 09/926,436, filed Jan. 18, 2002, now issued as U.S. Pat. No. 7,827,293, which is a National Stage of International Application No. PCT/CA01/00235, filed Mar. 1, 2001, the contents of which are hereby incorporated by reference in their entirety.

FIELD

The present invention relates to a method and system for network management system. In particular, the present invention relates to a method and system for controlling access of resource data to network resources.

BACKGROUND

Local area networks are widely used as a mechanism for making available computer resources, such as file servers, scanners, and printers, to a multitude of computer users. It is often desirable with such networks to restrict user access to the computer resources in order to manage data traffic over the network and to prevent unauthorized use of the resources. Typically, resource access is restricted by defining access control lists for each network resource. However, as the control lists can only be defined by the network administrator, it is often difficult to manage data traffic at the resource level.

Wide area networks, such as the Internet, have evolved as a mechanism for providing distributed computer resources without regard to physical geography. Recently, the Internet Print Protocol ("IPP") has emerged as a mechanism to control access to printing resources over the Internet. However, IPP is replete with deficiencies. For example, the ability to restrict access to firewall protected network resources is compromised when firewall access ports remain open for extended periods of time, i.e. are open and waiting for network traffic to access them. For example, access to IPP printers cannot be obtained without the resource administrator locating the resource outside the enterprise firewall, or without opening an access port through the enterprise firewall. Whereas the latter solution provides the resource administrator with the limited ability to restrict resource access, the necessity of keeping open an access port in the enterprise firewall exposes the enterprise network to the possibility of security breaches.

Further, there exists disadvantages in current network resource data transfer over networks of differing trust/protection levels, in particular in the specialized control of network resource data separate from the act of communicating the network resource data itself.

SUMMARY

According to the invention, there is provided a network resource access system and a method of network resource access which addresses at least one deficiency of the prior art network resource access systems.

Consequently, there remains a need for a network resource access solution which allows resource owners to easily and quickly provide resource access, which is not hindered by changes in device type and resource network address, which facilitates simultaneous communication with a number of target resources, and which does not expose the enterprise network to a significant possibility of security breaches. Other needs include the ability to control the processing of the network resource data before or after it is submitted for consumption by a corresponding network resource. Contrary to present prior art systems and methods there is provided a new method and corresponding system for coordinating submission of network resource data across a first network to a network resource located on a second network, the second network being coupled to the first network by a firewall such that the second network has a higher level of trust than that of the first network, the method comprising the steps of: receiving and storing in a storage the network resource data submitted by a network terminal coupled to the first network, the network resource data containing a network resource identifier for associating the network resource data with the network resource; receiving and storing in the storage control data associated with the network resource data, the control data for coordinating one or more actions on the network resource data; receiving a first poll message initiated through the firewall by a polling server located on the second network, the first poll message requesting stored network resource data containing the network resource identifier and forwarding the network resource data matching the network resource identifier to the polling server; and receiving a second poll message initiated through the firewall by the polling server, the second poll message requesting stored data matching the control data associated with the network resource data and forwarding the matched control data to the polling server.

A first aspect provided is a method for coordinating submission of network resource data across a first network to a network resource located on a second network, the second network being coupled to the first network by a firewall such that the second network has a higher level of trust than that of the first network, the method comprising the steps of: receiving and storing in a storage the network resource data submitted by a network terminal coupled to the first network, the network resource data containing a network resource identifier for associating the network resource data with the network resource; receiving and storing in the storage control data associated with the network resource data, the control data for coordinating one or more actions on the network resource data; receiving a first poll message initiated through the firewall by a polling server located on the second network, the first poll message requesting stored network resource data containing the network resource identifier and forwarding the network resource data matching the network resource identifier to the polling server; and receiving a second poll message initiated through the firewall by the polling server, the second poll message requesting stored data matching the control data associated with the network resource data and forwarding the matched control data to the polling server.

A second aspect provided is a method for coordinating submission of network resource data across a first network to a network resource located on a second network, the second network being coupled to the first network by a firewall such that the second network has a higher level of trust than that of the first network, the method comprising the steps of: submitting a first poll message initiated through the firewall by a polling server located on the second network to a proxy server located on the first network, the first poll message requesting any stored network resource data containing a network resource identifier, the network resource identifier for associating the network resource data with the network resource; receiving matching network resource data by the polling server from the proxy server; submitting a second poll message initiated through the firewall by the polling server to the proxy server, the second poll message requesting stored control data associated with the network resource data containing the network resource identifier, the control data for coordinating one or more actions on the network resource data; receiving matching control data by the polling server from the proxy server; and processing the matching network resource data according to the one or more actions contained in the matching control data.

A further aspect provided is a system for coordinating submission of network resource data across a first network to a network resource located on a second network, the second network being coupled to the first network by a firewall such that the second network has a higher level of trust than that of the first network, the system comprising: a proxy server located on the first network and configured for receiving and storing in a storage the network resource data submitted by a network terminal, the network resource data containing a network resource identifier for associating the network resource data with the network resource, and configured for receiving and storing in the storage control data associated with the network resource data, the control data for coordinating one or more actions on the network resource data; and a polling server located on the second network and coupled to the proxy server via the firewall, the polling server configured for initiating and submitting a first poll message through the firewall to the proxy server requesting any stored network resource data containing the network resource identifier and for receiving matching network resource data from the proxy server, the polling server further configured for initiating and submitting a second poll message through the firewall to the proxy server requesting stored control data associated with the network resource data containing the network resource identifier and for receiving matching control data from the proxy server and processing the matching network resource data according to the one or more actions contained in the matching control data.

BRIEF DESCRIPTION OF THE DRAWINGS

The preferred embodiment of the invention will now be described, by way of example only, with reference to the drawings, in which.

DETAILED DESCRIPTION OF THE PREFERRED EMBODIMENT

Figure 1:
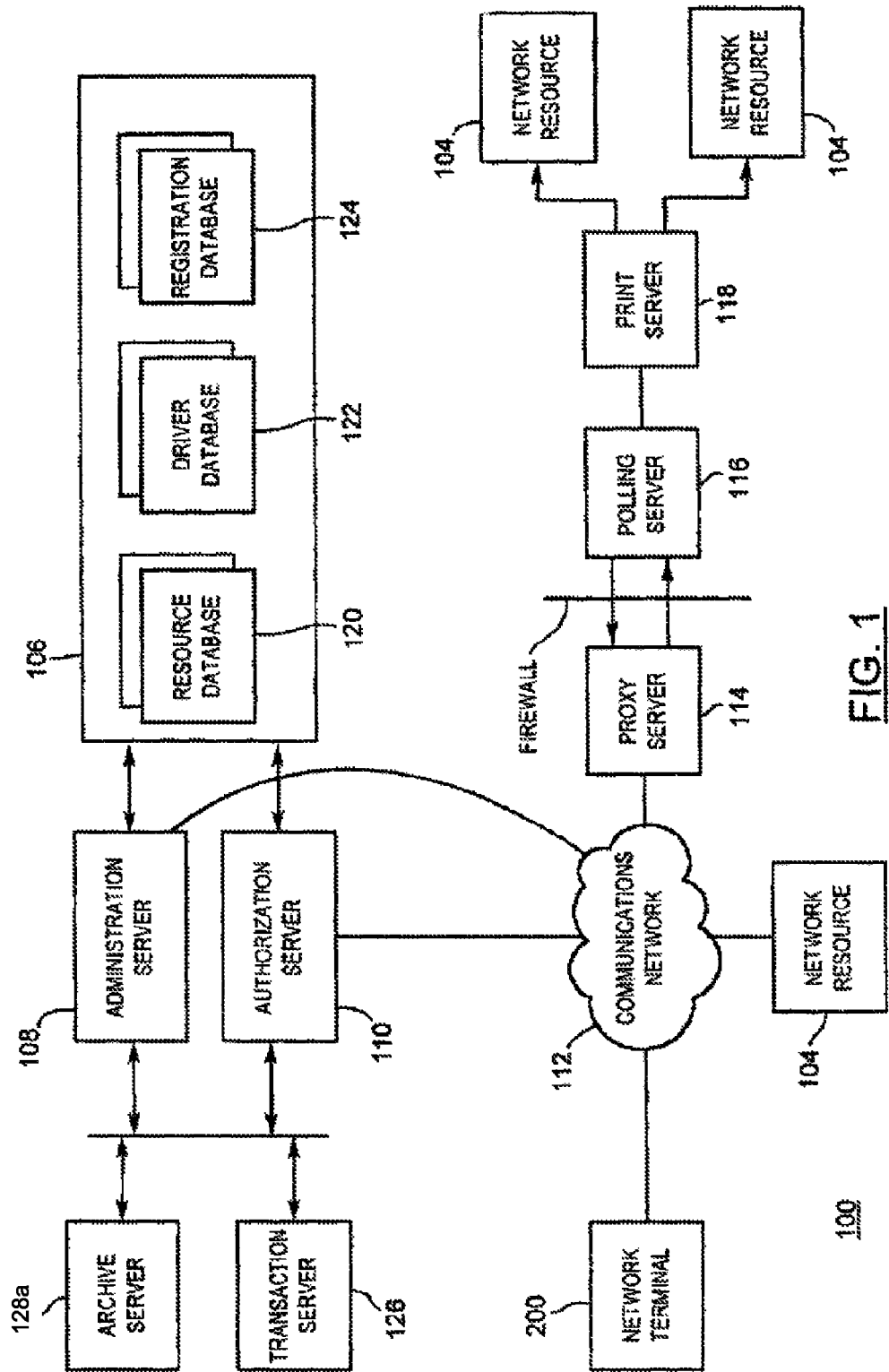
FIG. 1 is a schematic view of the network resource access system, according to the present invention, showing the network terminals, the network resources, the resource registry, the authorization server, the administration server, the proxy server, and the polling server.

Turning to FIG. 1, a network resource access system, denoted generally as 100, is shown comprising network terminals 200, network resources 104, a resource registry 106, an administration server 108, and an authorization server 110. Typically, the network resource access system 100 comprises a plurality of network terminals 200, and a plurality of network resources 104, however for enhanced clarity of discussion, FIG. 1 only shows a single network terminal 200 and a single network resource 104.

The network resource access system 100 also includes a communications network 112 facilitating communication between the network terminals 200, the network resources 104, the administration server 108, and the authorization server 110. Preferably, the communications network 112 comprises a wide area network such as the Internet, however the network 112 may also comprise one or more local area networks 112. Further, the network 112 need not be a land-based network, but instead may comprise a wireless network and/or a hybrid of a land-based network and a wireless network for enhanced communications flexibility.

Figure 6:
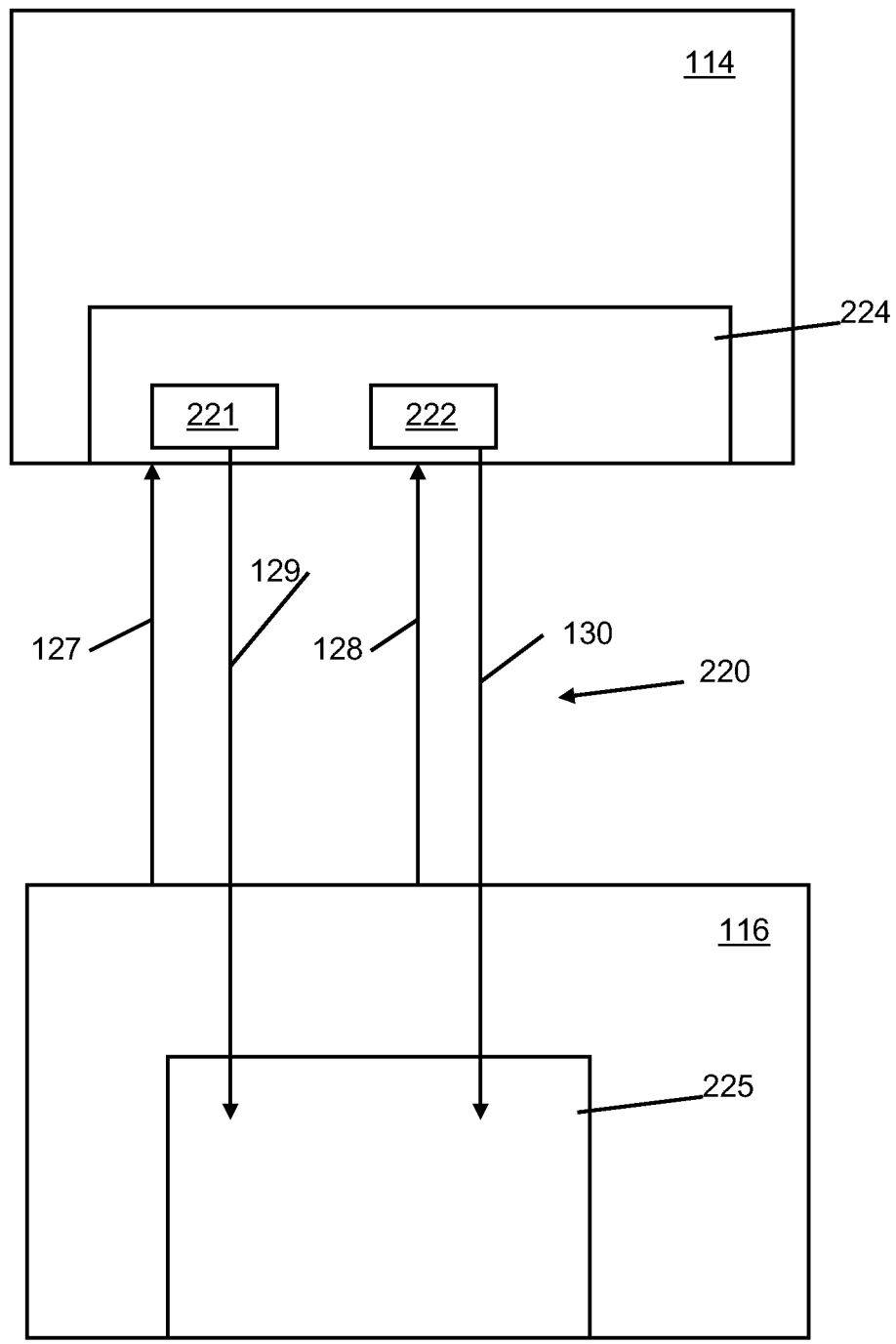
FIG. 6 shows a multi-stage polling mechanism of the system of FIG. 5.

Each network terminal 200 typically comprises a land-based network-enabled personal computer. However, the invention is not limited for use with personal computers. For instance, one or more of the network terminals 200 may comprise a wireless communications device, such as a wireless-enabled personal data assistant, or e-mail-enabled wireless telephone if the network 112 is configured to facilitate wireless data communication. In addition, the invention is not limited to only facilitating transmission of text data 221 (see FIG. 6), but instead may be used to transmit image data, audio data or multimedia data, if desired.

Figure 2:
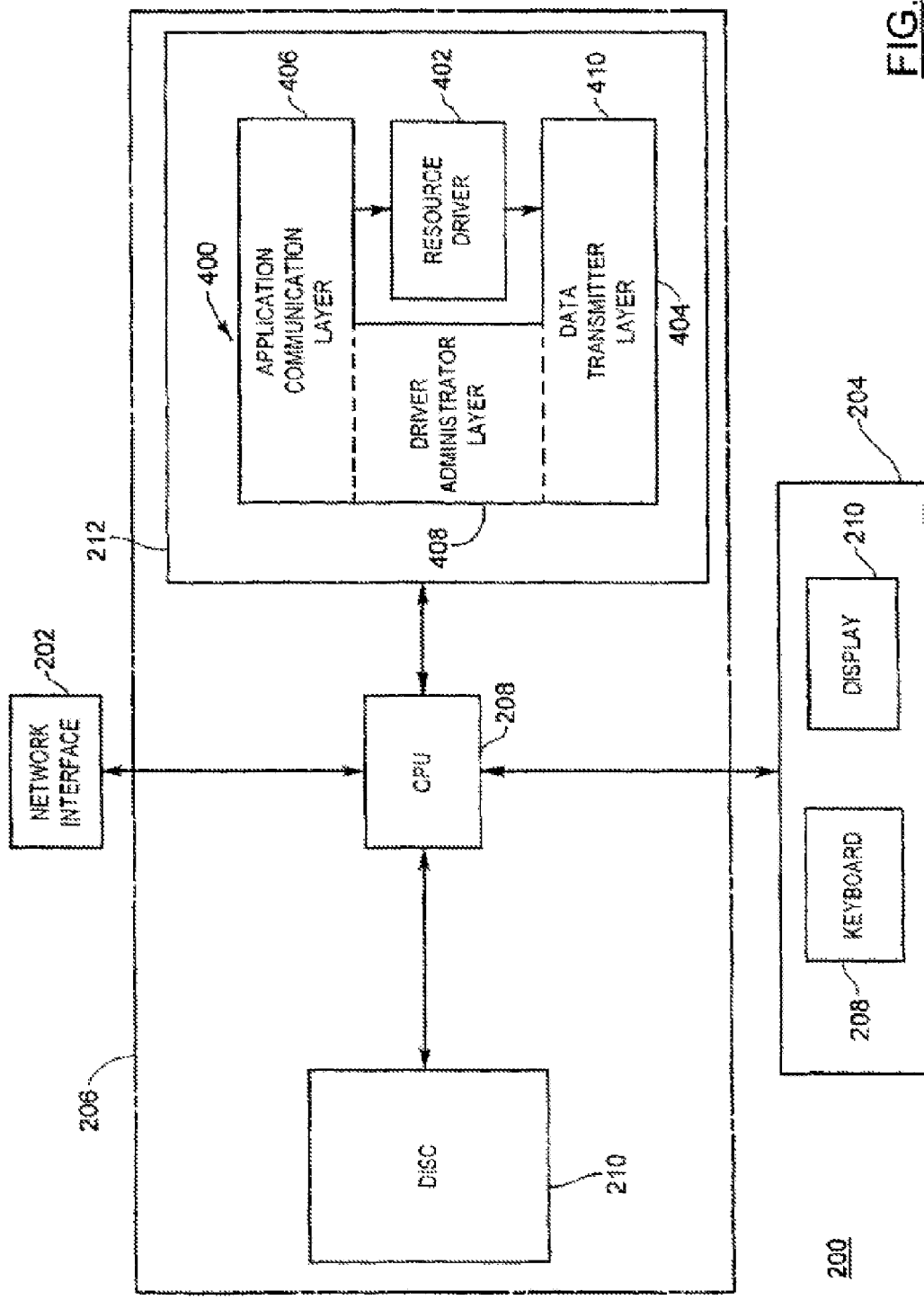
FIG. 2 is a schematic view one of the network terminals depicted in FIG. 1, showing the driver application for use with the present invention.

As shown in FIG. 2, the network terminal 200 comprises a network interface 202, a user interface 204, and a data processing system 206 in communication with the network interface 202 and the user interface 204. Typically, the network interface 202 comprises an Ethernet network circuit card, however the network interface 202 may also comprise an RF antenna for wireless communication over the communications network 112. Preferably, the user interface 204 comprises a data entry device 208 (such as keyboard, microphone or writing tablet), and a display device 210 (such as a CRT or LCD display).

The data processing system 206 includes a central processing unit (CPU) 208, and a non-volatile memory storage device (DISC) 210 (such as a magnetic disc memory or electronic memory) and a read/write memory (RAM) 212 both in communication with the CPU 208. The DISC 210 includes data which, when loaded into the RAM 212, comprise processor instructions for the CPU 208 which define memory objects for allowing the network terminal 200 to communicate with the network resources 104 and the authorization server 110 over the communications network 112. The network terminal 200, and the processor instructions for the CPU 208 will be discussed in greater detail below.

Typically, each network resource 104 can comprise a printing device, and in particular, an IPP-compliant printer. However, the invention is not limited for use with networked printers (IPP-compliant or otherwise), but instead can be used to provide access to any of a variety of data communication devices 104, including facsimile machines, image servers and file servers. Further, the invention is not limited for use with land-based data communications devices, but instead can be used to provide access to wireless communications devices. For instance, the network resource access system 100 can be configured to facilitate data communication with e-mail pagers or e-mail enabled wireless telephones 200.

Figure 5:
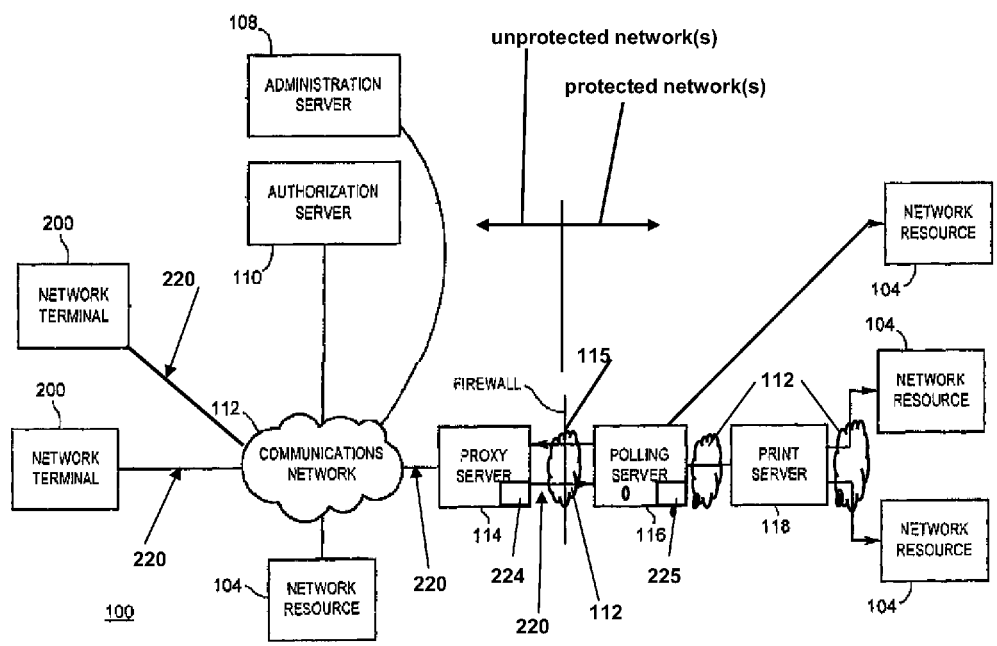
FIG. 5 shows a further embodiment of the network system of FIG. 1.

It is expected that some of the network resources 104 may be located behind an enterprise firewall 115 (see FIG. 5). Accordingly, to facilitate communication between network terminals 200 and firewall-protected network resources 104, the network resource access system 100 may also include a proxy server 114 located logically outside the enterprise firewall 115, and a polling server 116 located logically within the firewall 115, as shown in FIG. 1. Preferably, the proxy server 114 is located on-site at the enterprise responsible for administering the network resource 104, is provided with a network address corresponding to the enterprise, and includes a queue or other memory storage device 224 (see FIG. 5) for receiving application data 221 and control data 222 (see FIG. 6). However, the proxy server 114 may also be located off-site, and may be integrated with the authorization server 110 if desired. This latter option can be advantageous since it allows system administrators to provide access to network resources 104, but without having to incur the expense of the domain name registration and server infrastructure.

In addition to the proxy server 114 and the polling server 116, the enterprise can include an enterprise/resource server 118 (e.g. a print server) to facilitate communication with the network resources 104 located behind the firewall 115 and the polling server 116. The polling server 116 is in communication with the enterprise server 118, and is configured to initiate periodic polling messages 127,128 (see FIG. 6) to the proxy server 114 through the firewall 115 to determine whether application data 221 and/or control data 222 from or otherwise associated with a network terminal 200 is waiting in the memory 224 of the proxy server 114. The proxy server 114 is configured to transmit any stored/queued application data 221 to the polling server 116 in response to the poll signal 127 from the polling server 116, as well as any control data 222 associated with the application data 221 in response to a poll signal 128 as further described below with reference to a multistage polling mechanism. Upon receipt of the stored application data 221 from the proxy server 114, the polling server 116 can transmit the application data 221 to the enterprise server 118 for distribution to the appropriate network resource 104, for example. As will be apparent, this poll 127 mechanism allows application data 221 to be transmitted to network resources 104 located behind a firewall 115, but without exposing the enterprise to the significant possibility of security breaches associated with firewall 115 access ports that are always open. In other words, the firewall 115 access ports are opened based on when the polling 127,128 operations are to occur and then are preferably closed again until the next polling operation 127,128 occurs.

Figure 3:
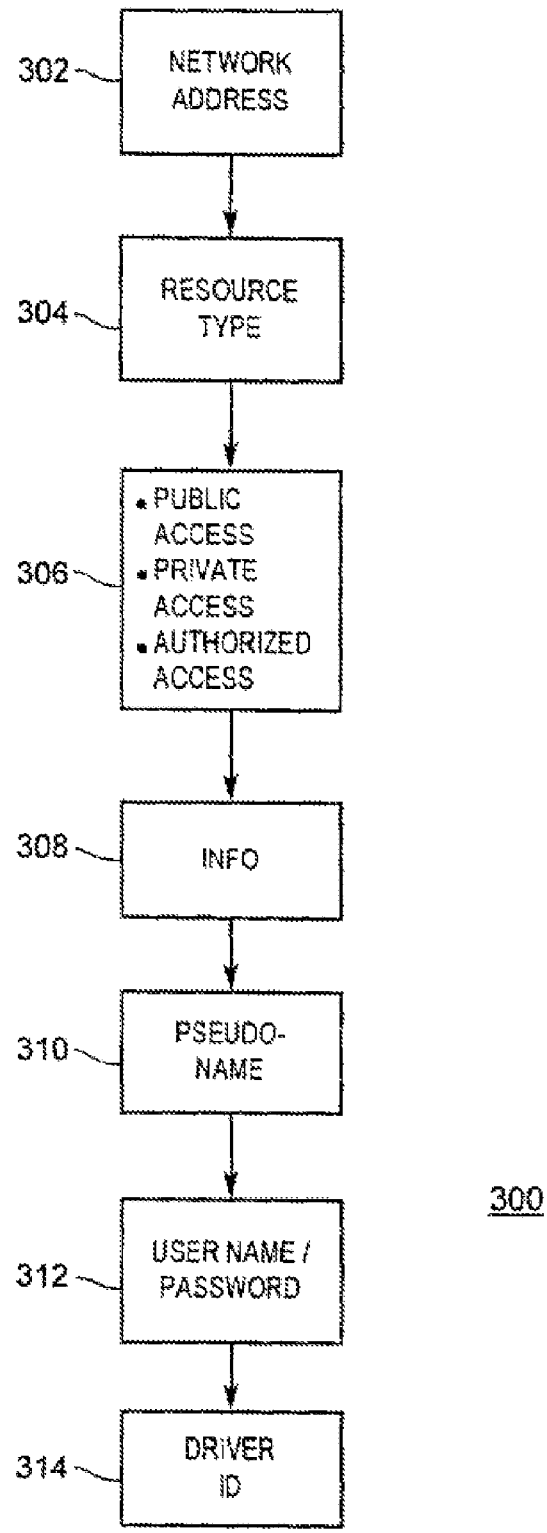
FIG. 3 is a schematic view of the format of the resource records comprising the resource database of the resource registry depicted in FIG. 1, showing the network address field, the resource type field, the user access level field, the resource information field, the pseudo-name field, the username/password field, and the driver identification field.

The resource registry 106 comprises a resource database 120, a driver database 222, and a user registration database 124. The resource database 120 includes resource records 300 identifying parameters associated with the network resources 104. As shown in FIG. 3, each resource record 300 comprises a network address field 302, a resource type field 304, and a user access level field 306 for the associated network resource 104. The network address field 302 identifies the network address of the network resource 104. As discussed above, typically each network resource 104 comprises an IPP-compliant printer, in which case the network address field 302 identifies comprises the network resource IPP address. However, in the case where the network resource 104 comprises a non-IPP-compliant device and the communications network 112 comprises the Internet, preferably the network resource 104 is linked to the communications network 112 via a suitable server, and the network address field 302 for the network resource 104 identifies the Internet Protocol ("IP") address of the server.

The resource type field 304 identifies the type of data communication device of the network resource 104. For instance, the resource type field 304 may specify that the network resource 104 is a printer, an image server, a file server, an e-mail pager, or an e-mail enabled wireless telephone. Further, the resource type field 304 may include a resource type sub-field specifying a sub-class of the network resource type. For example, the resource type sub-field may specify that the network resource 104 is an IPP-capable printer, or a non-IPP-capable printer.

The user access level field 306 identifies the type of communications access which the network terminals 200 are allowed to have in regards to the associated network resource 104. In the embodiment, as presently envisaged, the user access level field 306 establishes that the network resource 104 allows one of: (a) "public access" in which any network terminal 200 of the network resource access system 100 can communicate with the network resource 104; (b) "private access" in which only members (e.g. employees) of the enterprise associated with the network resource 104 can communicate with the network resource 104; and (c) "authorized access" in which only particular network terminals 200 can communicate with the network resource 104.

If the user access level field 306 specifies "authorized access" for a network resource 104, preferably the user access level field 306 includes a sub-field which lists the names of the network terminals 200 authorized to access the network resource 104, and a sub-field which includes an authorization password which the identified network terminals 200 must provide in order to access the network resource 104. If the user access level field 306 specifies "private access" for a network resource 104, preferably the user access level field 306 includes a sub-field which lists the network address of the network terminals 200 which are deemed to members of the enterprise.

It should be understood, however, that the user access level field 306 is not limited to identifying only the foregoing predefined user access levels, but may instead identify more than one of the predefined user access levels, or other user access levels altogether. For instance, the user access level field 306 may identify that the associated network resource 104 allows both private access to all employees of the enterprise running the network resource 104, and authorized access to other preidentified network terminals 200. Further, the user access level field 306 may also include one or more sub-fields (not shown) which provide additional restrictions/permissions on the type of communications access which the network terminals 200 are allowed to have in regards to the associated network resource 104. For instance, the user access level sub-fields may limit the hours of operation of the network resource 104, or may place restrictions on the type of access limitations on a per-user basis, or per-group basis. Other variations on the type of access will be readily apparent, and are intended to be encompassed by the scope of the present invention.

Preferably, each resource record 300 includes an information field 308 which provides information on the network resource 104, such as data handling capabilities, resource pricing and geographical co-ordinates. This latter parameter is particularly advantageous for use with mobile network terminals 200, such as a wireless-enabled personal data assistant or an e-mail-enabled wireless telephone, since it allows the network terminal 200 to identify the nearest one of a plurality of available network resources 104.

Each resource record 300 can also include a pseudo-name field 310, a username/password field 312 and a network driver identifier field 314. The pseudo-name field 310 contains a resource pseudo-name which identifies the network resource 104 to the network terminals 200. Preferably, the pseudo-name is a network alias that identifies the physical location and properties of the network resource 104, but does not identify the network address of the resource 104. Further, preferably each pseudo-name uniquely identifies one of the network resources 104, however a group of the network resources 104 may be defined with a common pseudo-name to allow communication with a group of network resources 104. This latter feature is particularly advantageous since it allows the administrator of an enterprise associated with the group of network resources to dynamically allocate each network resource 104 of the group as the demands for the network resources 104 or maintenance schedules require.

In addition, preferably the resource record 300 includes a plurality of the pseudo-name fields 310 to allow the administrator of the associated network resource 104 to update the name assigned to the network resource 104, while also retaining one or more previous pseudo-names assigned to the network resource 104. As will be explained, this feature is advantageous since it allows the administrator to update a resource name without the risk that network terminals 200 using a prior pseudo-name will be unable to locate or communicate with the network resource 104.

The username/password field 312 contains a unique username and password combination which allows the administrator of the associated network resource 104 to prevent authorized access and alteration to the data contained in the resource record 300. Preferably, each resource record 300 also includes an e-mail address field (not shown) which the network resource access system 100 uses to provide the administrator of the associated network resource 104 with a notification e-mail message when a message is successfully transmitted to the network resource 104.

The driver identifier field 314 contains a resource driver identifier which is used in conjunction with the driver database 122 to provide the network terminals 200 with the appropriate resource driver for communication with the network resource 104. The driver database 122 includes resource drivers which allow software applications installed on the network terminals 200 to communicate with the network resources 104. As will be explained below, in order for a network terminal 200 to communicate with a selected network resource 104, the network terminal 200 first downloads a driver application data from the administration server 108 over the communications network 112. The network terminal 200 may also download the appropriate resource driver from the driver database 122 (via the authorization server 110 over the communications network 112), and then allow the authorization server 10 to configure the downloaded resource driver in accordance with the access level field 306 of the resource record 300 associated with the selected network resource 104. Preferably, each resource driver includes a resource driver identifier which allows the authorization server 110 to identify the resource driver which the network terminal 200 has downloaded. It is also recognised that the driver database 122 can contain generic drivers to permit appropriate consumption/processing of the application data 221 by the receiving network resource 104. the following is only one example of driver configuration of the network terminal 200 used to configure the application data 221 for subsequent consumption/processing by the target network resource 104. It is also recognised that the network terminals 200 and the corresponding network resources 104 could be preconfigured with a generic driver to provide for preconfigured transmission and consumption/processing of the application data 221.

The example dynamically configurable driver application will now be discussed in association with FIG. 2. As discussed above, the DISC 210 of the network terminal 200 includes data which, when loaded into the RAM 212 of the network terminal 200, comprise processor instructions for the CPU 208. As shown, the downloaded driver application data defines in the RAM 212 a memory object comprising a driver application 400. The driver application 400 includes a generic resource driver 402 and a wrap-around resource driver layer 404. The generic resource driver 402 allows the network terminal 200 to communicate with a variety of different network resources 104, however the generic resource driver 402 typically will not provide the network terminal 200 with access to all the features and capabilities of any particular network resource 104. If the network terminal 200 requires additional features not implemented with the generic resource driver 402, the appropriate resource driver may be downloaded from the driver database 116, as mentioned above.

The wrap-around driver layer 404 includes an application communication layer 406, a driver administrator layer 408, and a data transmitter layer 410. The application communication layer 406 is in communication with the resource driver 402 (generic or network resource specific) and the application software installed on the network terminal 200, and is configured to transmit user application data between the application software and the resource driver 402. The driver administrator layer 408 communicates with the resource registry 106 over the communications network 112 to ensure that the driver application 400 is properly configured for communication with the selected network resource 104. The data transmitter layer 410 is in communication with the resource driver 402 and is configured to transmit the data output from the resource driver 402 over the communications network 112 to the selected network resource 104, via the network interface 202. Although the driver application 400 and its constituent component layers are preferably implemented as memory objects or a memory module in the RAM 212, it will be apparent that the driver application 400 may instead be implemented in electronic hardware, if desired. Returning to FIG. 1, the registration database 124 of the resource registry 106 includes user records each uniquely associated with a user of a respective network terminal 200 upon registration with the network resource access system 100. Each user record identifies the name the registered user's name, post office address and e-mail address. In addition, each user record specifies a unique password which the registered user must specify in order to update the user's user record, and to obtain access to network resources 104 configured for "authorized access". The user record may also include additional information specifying default options for the network resource access system 100. For instance, the user may specify that the network resource access system 100 should provide the user with an acknowledgement e-mail message when a message is successfully transmitted to a selected network resource 104. The user may also specify an archive period for which the network resource access system 100 should archive the message transmitted to the selected network resource 104. This latter option is advantageous since it allows the user to easily transmit the same message to multiple network resources 104 at different times, and to periodically review transmission dates and times for each archive message.

The administration server 108 is in communication with the resource database 120 and the registration database 124. The administration server 108 provides administrators of the network resources 104 with access to the records of the resource database 120 to allow the administrators to update the network address field 302, the resource type field 304, the user access level field 306, the resource information field 308, the pseudo-name field 310, the username/password field 312 and/or the driver identifier field 314 of the resource record 300 for the associated network resource 104. As will become apparent, this mechanism allows network administrators to change, for example, the network address and/or the restrictions/permissions of the network resources 104 under their control, or even the network resource 104 itself, without having to notify each network terminal 200 of the change. The administration server 108 also provides controlled access to the registration database 124 so that only the user of the network terminal 200 which established the user record can update the user record.

Where the username/password field 312 has been completed, the administration server 108 is configured to block access to the resource record 300 until the administrator provides the administration server 108 with the correct username/password key. This feature allows the resource administrator to make adjustments, for example, to pricing and page limit, in response to demand for the network resources 104, and to make adjustments to the restrictions/permissions set out in the user access level field 306 and the resource information field 308 and thereby thwart unauthorized access to the network resources 104.

The authorization server 110 is in communication with the resource database 120 and the driver database 122 for providing the network terminals 200 with the resource drivers 402 appropriate for the selected network resources 104. Preferably, the authorization server 110 is also configured to configure the driver application 400 for communication with the selected network resource 104, by transmitting the network address of the selected network resource 110 to the data transmitter layer 410 over a communications channel secure from the user of the network terminal 200 so that the network address of the network resource 104 is concealed from the user of the network terminal 200. In the case where the communications network 112 comprises the Internet, preferably the secure communications channel is established using the Secure Sockets Layer ("SSL") protocol. It is also recognised that the authorization server 110 can be used to provide the network terminal 200 with a list of available network resources 104 that are accessible by the user of the network terminal 200 and also are appropriate for consumption/processing of the particular application data 221 as desired by the network terminal 200 user (e.g. specific network resources 104 may provide certain desired processing features while others may not). Examples of specific processing/consumption features of the network resources 104 that can be specified by the network terminal 200 can include features such as but not limited to: colour, print quality, print resolution, viewing resolution, processing cost, location of the resource 104, etc.

In addition to the network terminal 200, the network resource 104, the resource registry 106, the administration server 108, the authorization server 110, and the communications network 112, the network resource access system 100 can also include optionally a transaction server 126 and an archive server 128a. The transaction server 126 is in communication with the authorization server 110 for keeping track of each data transfer between a network terminal 200 and a network resource 104. For each transmission, preferably the transaction server 126 maintains a transmission record identifying the network terminal 200 which originated the transmission, the network resource 104 which received the transmission, and the date, time and byte size of the transmission.

The archive server 128a is configured to retain copies of the data transmitted, for a specified period. As discussed above, the user of a network terminal 200 specifies the requisite archive period (if any) for the data transmission, upon registration with the network resource access system 100. Preferably, the administration server 108 provides controlled access to the transaction server 126 and the archive server 128a so that only the user of the network terminal 200 which originated transmission of the data is allowed access to the transmission record associated with the transmission.

Figure 4A:
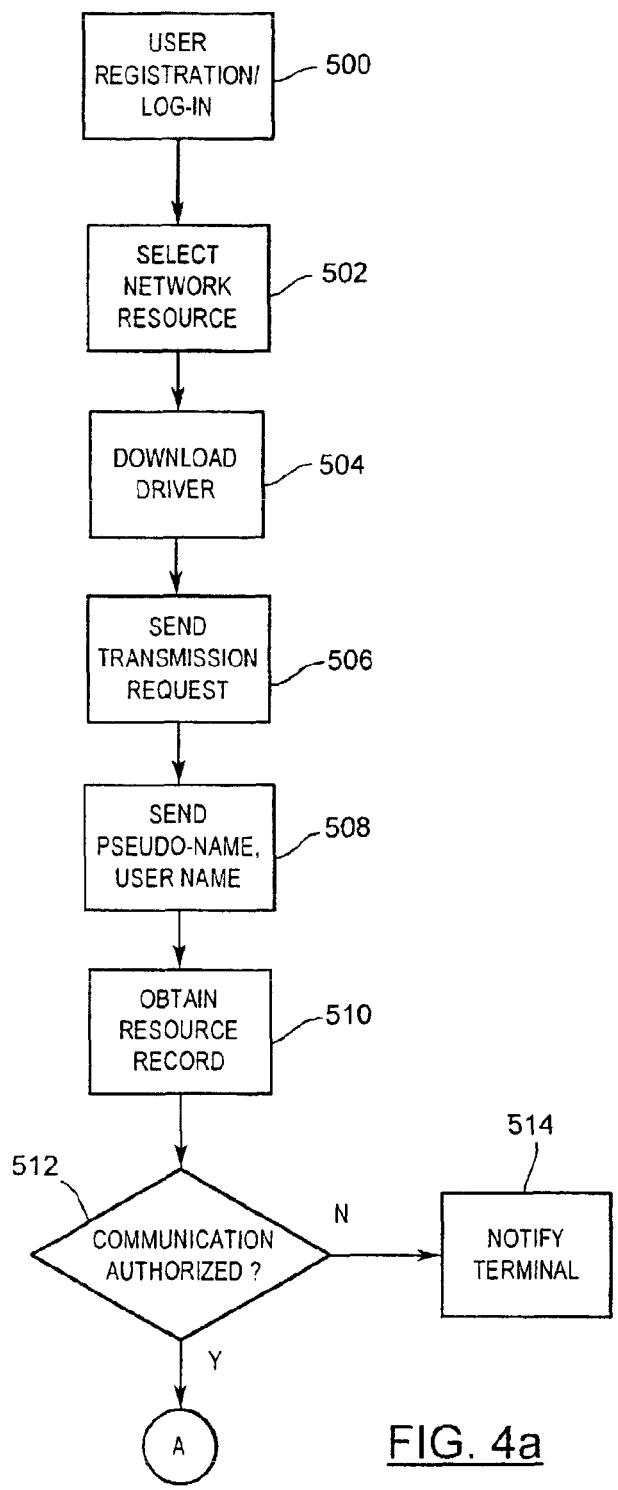
FIGS. 4a,b are flow charts depicting the method of operation of the network resource access system.
Figure 4B:
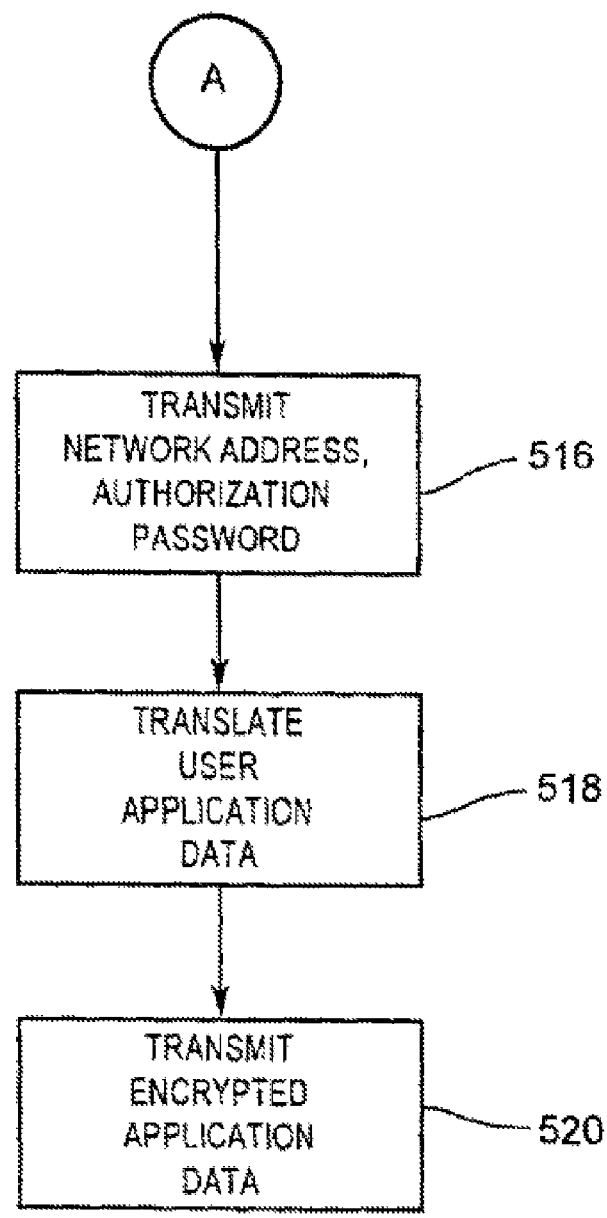

The process by which a user of a network terminal 200 can communicate with a network resource 104 is now described by example with reference to FIG. 4. The following discussion presupposes that the user of the network terminal 200 has downloaded or otherwise has a suitable driver application 400 (e.g. from the administration server 108 over the communications network 112). At step 500, the user of a network terminal 200 decides whether to log in to the network resource access system 100. As discussed above, if the user registers with the network resource access system 100 and subsequently logs in to the network resource access system 100 (by providing the authorization server 106 with the user's assigned password), the user will have access to any network resources 104 which have "authorized access" as the user access level and which have identified the registered user as a user authorized to access the network resource 104. If the user does not register or fails to log in to the network resource access system 100, the user will only have access to network resources 104 which have established "public access" as the user access level.

At step 502, the user selects a network resource 104 by querying the administration server 108 for a list of available network resources 104. Alternately, the user may postpone selection of a network resource 104 until initiation of the transmission command. The network user query may be based upon any desired criteria, including print turn-around time and page size (where the target network resource 104 is a printer), price, and geography. In addition, the user may provide the administration server 108 with the geographical coordinates of the user to determine the user's nearest network resources. The user may provide its geographical coordinates through any suitable mechanism known to those skilled in the art, including latitude/longitude co-ordinates, GPS, and wireless triangulation.

If the user requested a list of available network resources 104, the user is provided with a list of pseudo-names associated with each network resource 104 satisfying the designated search criteria. As discussed above, if the user logged in to the network resource access system 100, the pseudo-name list will include both "public access" network resources 104 and "authorized access" network resources 104 with which the user has been authorized to communicate. Also, if the user is member of an enterprise having network resources 104 registered with the network resource access system 100, the pseudo-name list will also identify network resources 104 which have been registered by the enterprise for "private access". Otherwise, the pseudo-name list will only identify network resources 104 registered for public access. Upon receipt of the resource list, the user selects a network resource 104 from the list.

At step 504, the administration server 108 queries the network user's network terminal 200 for the resource driver identifier of the resource driver 402 configured on the network terminal 200, and then compares the retrieved resource driver identifier against the resource driver identifier specified in the network driver identifier field 314 of the resource record 300 associated with the selected network resource 104 to determine whether the driver application 400 has been configured with the appropriate resource driver 402 for communication with the network resource 104. If the network terminal 200 has not been configured with the appropriate resource driver 402, the administration server 108 prompts the user's network terminal 200 to download the necessary resource driver 402. As will be apparent, the downloaded resource driver 402 becomes part of the driver application 400.

When the user of the network terminal 200 is ready to communicate with the selected network resource 104, the user of the network terminal 200 transmits a transmission request via its application software to the driver application 400, at step 506. If the user did not select a network resource 104 at step 502, the application communication layer 406 of the driver application 400 contacts the administration server 108 over the communications network 112 and prompts the user to select a network resource 104, as described above. Once a network resource 104 is selected, and the appropriate resource driver 402 is installed, the application communication layer 406 notifies the driver administrator layer 408 of the transmission request.

At step 508, the driver administrator layer 408 provides the authorization server 110 with the transmission request and identifies the selected network resource 104, by transmitting to the authorization server 110 the pseudo-name assigned to the selected network resource 104. If the user of the network terminal 200 has registered and logged in to the network resource access system 100, the driver administrator layer 408 also provides the authorization server 110 with the registered user's name.

The authorization server 110 then queries the resource database 120 with the received pseudo-name for the resource record 300 associated with the pseudo-name, at step 510. The authorization server 110 then extracts the user access level from the user access level field 306 of the retrieved resource record 300, and determines whether the network terminal 200 is authorized to communicate with the selected network resource 104, at step 512. As will be apparent from the foregoing discussion, if the user access level field 306 specifies "public access" for the network resource 104, the network terminal 200 will be automatically authorized to communicate with the network resource 104.

However, if the user access level field 306 specifies "private access" for the network resource 104, the authorization server 110 determines the network address of the network terminal 200 from the transmission request transmitted by the network terminal 200, and then queries the user access level sub-field with the terminal's network address to determine whether the network terminal 200 is authorized to communicate with the network resource 104. In the case where the communications network 112 comprises the Internet, the authorization server 110 can determine the network terminal's network address from the IP packets received from the network terminal 200. On the other hand, if the user access level field 306 specifies "authorized access" for the network resource 104, the authorization server 110 queries the user access level sub-field with the user's name to determine whether the network terminal 200 is authorized to communicate with the network resource 104.

If the query at step 512 reveals that the network terminal 200 is not authorized to communicate with the network resource 104, at step 514 the authorization server 110 provides the network terminal 200 with a notification that the network terminal 200 is not authorized for communication with the selected resource 104. However, if the query at step 512 reveals that the network terminal 200 is authorized to communicate with the network resource 104, the authorization server 110 queries the network address field 302 of the resource record 300 associated with the network resource 104 for the network address of the network resource 104. The authorization server 110 then establishes a secure communications channel with the driver administrator layer 408, and then transmits the network address to the driver administrator layer 408 over the secure communications channel, at step 516.

Also, if the user access level field 306 specifies "authorized access" for the network resource 104, and the network terminal 200 is authorized to communicate with the network resource 104, the authorization server 110 queries the user access level sub-field for the authorization password assigned to the network resource 104, and then transmits the authorization password to the driver administrator layer 408 over the secure communications channel, together with the network address. In the case where the communications network 112 comprises the Internet, preferably the authorization server 110 establishes the secure communications channel using a Secure Sockets Layer ("SSL") protocol. Since the network address and the authorization password are transmitted over a secure communications channel, this information is concealed from the user of the network terminal 200.

Preferably, the authorization server 110 also extracts the resource driver identifier from the resource identifier field 314 of the resource record 300, and determines whether the network terminal 200 is still properly configured for communication with the network resource 14. If the network terminal 200 no longer has the correct resource driver 402, the authorization server 110 queries the driver database 122 for the correct resource driver 402, and prompts the user of the network terminal 200 to download the correct resource driver 402. This driver configuration verification step may be performed concurrently or consecutively with the network address providing step described in the preceding paragraph.

In addition, the administration server 108 queries the registration database 124 to determine whether the user of the network terminal 200 registered with the network resource access system 100. If the user registered with the network resource access system 100 and specified that the archive server 128*a* should maintain archival copies of data transmissions, the administration server 108 transmits the network address of the archive server 128*a* to the driver administrator layer 408. As a result, when the user of the network terminal 200 issues a data transmission command, the driver application 400 will transmit the user application data to the selected network resource 104 and to the archive server 128*a*.

At step 518, the application communication layer 406 passes the application data received from the application software to the resource driver 402 for translation into a format suitable for processing by the selected network resource 104. Meanwhile, the driver administrator layer 408 interrogates the network resource 104, using the received network address, to determine whether the network resource 104 still resides at the specified network address, is operational and is on-line.

If the interrogated network resource 104 resides at the specified network address, is operational and is on-line. online, the resource driver 202 passes the translated application data to the data transmitter layer 410 of the driver application 400. Preferably, the data transmitter layer 410 compresses and encrypts the translated application data upon receipt. The data transmitter layer 410 also receives the network address of the network resource 104 from the driver administrator layer 408, adds the network address data to the compressed, encrypted data, and then transmits the resulting data over the communications network 112 to the network resource 104 at the specified network address, at step 520.

Preferably, the data transmitter layer 410 also transmits details of the transmission to the transaction server 126, such as the selected network resource 104 and the byte size of the transmission. Upon receipt of the transmission details, preferably the administration server 108 queries the resource database 120 and the user registration database 124 for the e-mail address of the resource administrator and the e-mail address of the user of the network terminal 200, if provided, and then transmits an email message indicating completion of the transmission.

If the user access level field 306 specifies "authorized access" for the network resource 104, the data transmitter layer 410 also receives the authorization password for the network resource 104 from the driver administrator layer 408, and transmits the authorization password (as part of the compressed, encrypted data) to the network resource 104.

If the user access level field 306 specifies "public access" for the network resource 104, preferably the network resource 104 is accessible through a local server which serves to queue, decrypt and decompress the application data, and extract the network address data, and then transmit the decompressed application data to the appropriate network resource 104. Alternately, the network resource 104 itself may be configured for direct communication over the communications network 112, such as an IPP-capable printer, so that the network resource 104 is able to process the application data directly.

If the user access level field 306 specifies "authorized access" for the network resource 104, preferably the network resource 104 is accessible through a local server which serves to queue, decrypt and decompress the application data, and extract the network address data and authorization password, and then transmit the application data to the appropriate network resource 104 if the received authorization password is valid.

If the user access level field 306 specifies "private access" for the network resource 104, typically the network resource 104 will be located behind a firewall. Accordingly, the proxy server 114 associated with the network resource 104 will receive the application data, and transfer the application data to the proxy server queue. The polling server 116 associated with the network resource 104 will poll the proxy server 114 to determine the status of the queue. Upon receipt of a polling signal from the polling server 116, the proxy server 114 transmits any queued application data from the proxy server queue, through the firewall, to the polling server 116. The polling server 116 then extracts the network address from the received application data, and transmits the application data to the appropriate server 118 or network resource 104 for processing.

As will be apparent from the foregoing discussion, regardless of the user class defined for a network resource 104, if a resource administrator relocates a network resource 104 to another network address, and/or changes the device type and/or restrictions/permissions associated with the network resource 104, the resource administrator need only update the resource record 300 associated with the network resource 104 to continue communication with the network resource 104. Subsequently, when a user attempts communication with the network resource 104 using the original pseudo-name, the authorization server 110 will provide the administrator layer 408 with the updated network address of the network resource 104, or prompt the user to download the appropriate resource driver 402, assuming that the network terminal 200 is still authorized to communicate with the network resource 104.

Further, if the user access level field 306 specifies "authorized access" for the network resource 104 and the resource administrator desires to change the pseudo-name and authorization password associated with the network resource 104, the resource administrator need only update the pseudo-name and authorization password provided on the resource record 300. Subsequently, when a user of a network terminal 200 initiates communication with the network resource 104 using the original pseudo-name, the authorization server 110 scans the resource records 300 for occurrences of the original pseudo-name. After locating the appropriate resource record 300, the authorization server 110 provides the driver administrator layer 408 with the updated pseudo-name and authorization password of the network resource 104, provided that the network terminal 200 is still authorized to communicate with the network resource 104. A network terminal 200 which is not authorized to communicate with the network resource 104 will not receive the updated pseudo-name and authorization password from the authorization server 110 and, consequently, will not be able to communicate with the network resource 104, even if the user of the network terminal 200 knew the network address for the network resource 104.

Further Example Configurations of the Network Resource Control System 100

Referring to FIG. 5, shown is the network resource control system 100 including a plurality of network terminals 200 in communication with a plurality of network resources 104 via one or more proxy servers 114 (only one is shown for convenience) through a communications network 112. It is recognised that the communications network 112 can be an intranet, an extranet (e.g. the Internet), a combination of intranet(s) and extranet(s), or any other combination of networks configured for providing electronic communications 220 between the network terminal 200 and the proxy server 114 and between the proxy server 114 and the polling server 116. For example, the network terminal 200 can reside on an intranet 112 connected to an extranet 112 for communication with the proxy server 114. The proxy server 114 can communicate with the polling server 116 also via the extranet 112 and/or via an intranet 112. For example, the proxy server 114 and polling server 116 can be configured on the same computer or can be configured on different computers, as hardware, software, or a combination thereof. The firewall 115 can be hardware, software, or combination thereof positioned between the proxy server 114 and the polling server 116.

Firewall 115

The firewall 115 is a dedicated appliance, and/or software running on a computer, which inspects network traffic 220 passing through it, and denies or permits passage of the network communications 220 based on a set of rules/criteria. For example, the firewall 115 can be associated with the computer configured for the polling server 116 or can be associated with the computer configured for both the polling server 116 and the proxy server 114. In terms of the network system 100, the firewall is placed between a protected network 112 and an unprotected (or protected to a lesser degree than the protected network) network 112 and acts like a gate to protect assets to provide that nothing/limited private goes out and nothing/limited malicious comes in. Access and passage of communications 220 through the firewall 115 can be performed via a number of access ports in the firewall 115 as is known in the art. Accordingly, the firewall 115 is configured to block unauthorized access to the polling server 116 and downstream components of resource server 118 and/or network resource(s) 104 associated with the polling server 116, while permitting authorized communications 220 as initiated from the polling server 116 to the proxy server 114 from inside of the firewall 115 (i.e. polling initiated by the polling server 116 in the direction of from the protected network 112 to the unprotected network 112). It is recognised that the firewall 115 is a network entity (i.e. a configured device or set of devices) which permits or denies access to the polling server by computer applications/servers located outside of the firewall 115, based upon a set of rules and other network protection criteria. It is recognised that all messages and communications 220 entering or leaving the polling server 116 pass through the firewall 115, which examines each message and communications 220 and blocks those that do not meet the specified security criteria of the firewall 115 configuration.

In view of the above, the firewall's 115 basic task is to regulate some of the flow of traffic 220 between computer networks 112 having different trust levels (e.g. the proxy server 114 is on a network 112 of a lower trust level than the network 112 that the polling server 116 is on). Typical examples are the Internet 112 which is a zone with no trust and an internal network 112 which is a zone of higher trust. A zone with an intermediate trust level, situated between the Internet 112 and a trusted internal network 112, can be referred to as a "perimeter network" 112 or Demilitarized zone (DMZ). Accordingly, an unprotected network 112 may have some protection (i.e. a specified level of trust) or no protection (i.e. no level of trust) that is lower protection (i.e. a lower specified level of trust) than the specified level of trust of the protected network 112.

There are several types of firewall 115 techniques, such as but not limited to: packet filtering that inspects each packet 220 passing through the network 112 and accepts or rejects it based on user-defined rules associated with the firewall 115 configuration; application gateway that applies security mechanisms to specific applications, such as FTP and Telnet servers; circuit-level gateway that applies security mechanisms when a TCP or UDP connection for the communications 220 is established, such that once the connection has been made, the packets 220 can flow between the servers 114,116 without further checking; and Proxy server based that intercepts all messages 220 entering and leaving the network 112, such that the proxy server 114 effectively hides the true network addresses of the polling server 116 and/or the print server 118 and network resources 104.

Proxy Server 114

The electronic communications 220 forwarded to the proxy server 114 (e.g. from the network terminal 200) can include network resource data 221 (see FIG. 6) for consumption (i.e. processing) by the network resource 104 and control data 222 (see FIG. 6) for coordinating operation of the polling server 116 in relation to the stored network resource data 221 available in a storage 224 (e.g. queue, buffer, etc.) or that network resource data 221 already sent to the network resource 104 (or intervening network resource server 118) from the polling server 116. It is also recognised that the polling server 116 can contain a storage 225 for storing network resource data 221 obtained from the proxy server 114.

The storage 224,225 can be configured as keeping the stored electronic communications 220 in order and the principal (or only) operations on the stored electronic communications 220 are the addition of the stored electronic communications 220 and removal of the stored electronic communications 220 from the storage 224,225 (e.g. FIFO, FIAO, etc.). For example, the storage 224,225 can be a linear data structure for containing and subsequent accessing of the stored electronic communications 220 and/or can be a non-linear data structure for containing and subsequent accessing of the stored electronic communications 220.

Further, the storage 224,225 receives various entities such as data 221,222 that are stored and held to be processed later. In these contexts, the storage 224,225 can perform the function of a buffer, which is a region of memory used to temporarily hold data 221,222 while it is being moved from one place to another (i.e. between the network terminal 200 to the network resource 104). Typically, the data 221,222 is stored in the memory when moving the data 221,222 between processes within/between one or more computers. It is recognised that the storage 221,222 can be implemented in hardware, software, or a combination thereof. The storage 224, 225 is used in the network system 100 when there is a difference between the rate/time at which data 221,222 is received (e.g. from the network terminal 200) and the rate/time at which the data 221,222 can be processed (e.g. ultimately by the network resource 104).

In terms of a server, it is recognised that the proxy server 114 (as well as the polling server 116, resource server 118, administration server 108 and/or authorization server 110) can be configured as hardware, software, or typically a combination of both hardware and software to provide a network 112 entity that operates as a socket listener. It is recognised that any computerised process that shares a resource (e.g. data 221,222) to one or more client processes can be classified as a server in the network system 100. The term server can also be generalized to describe a host that is deployed to execute one or more such programs, such that the host can be one or more configured computers that link other computers or electronic devices together via the network 112. The servers 114, 116,118, 108, 110 can provide specialized services across the network 112, for example to private users inside a large organization or to public users via the Internet 112. In the network system 26, the servers can have dedicated functionality such as proxy servers, print/resource servers, and polling servers. Enterprise servers are servers that are used in a business context and can be run on/by any capable computer hardware. In the hardware sense, the word server typically designates computer models intended for running software applications under the heavy demand of a network 112 environment. In this client-server configuration one or more machines, either a computer or a computer appliance, share information with each other with one acting as a host for the other. While nearly any personal computer is capable of acting as a network server, a dedicated server will contain features making it more suitable for production environments. These features may include a faster CPU, increased high-performance RAM, and typically more than one large hard drive. More obvious distinctions include marked redundancy in power supplies, network connections, and even the servers themselves.

Polling Server 116

Referring again to FIG. 5, the polling server 116 provides the communication through the firewall 115 for facilitating communication of any data 221,222 in the storage 224 of the polling server 114 towards the network resources 104 and/or resource server 118. It is recognised that the polling server 116 polls the proxy server 114 for any data 221,222 applicable to the polling server 116 (e.g. those data 221,222 communications associated with the server 118 and/or network resources 104 associated with the respective polling server 116).

Figure 7:
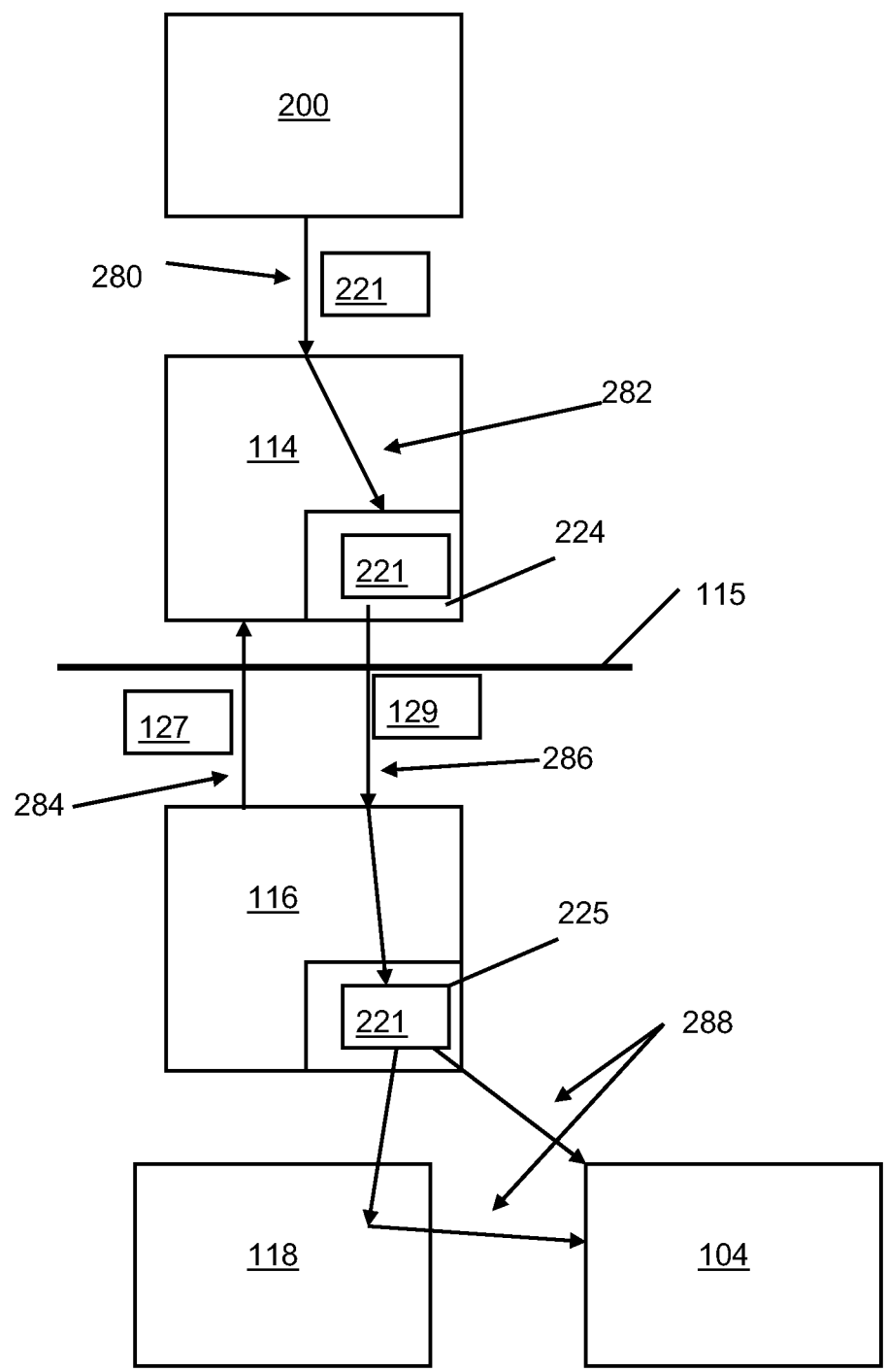
FIG. 7 shows a one stage of the multi-stage polling mechanism of FIG. 6.

Referring to FIG. 7, in effect, the transfer of resource data 221 from the network terminal 200 to the network resource 104 is done in stages over the communication network 112. One stage 280 is to transmit the network resource data 104 from the network terminal 200 to the proxy server 114, for subsequent delivery to the appropriate network resource 200 selected/confirmed by the network terminal 200 as the ultimate destination for processing/consumption (e.g. printing, viewing, etc. of the resource data 221). Another stage 282 is receipt of the network resource data 221 by the proxy server 114 and storage of the received resource data 221 in the storage 224. Another stage 284 is for the polling server 116 to submit a poll message 127 initiated from inside of the firewall 115 through an opened port in the firewall 115 to the proxy server 114 requesting the availability/presence in the storage 224 of any resource data 221 directed to any of the network resources 104 associated with the polling server 116.

Another stage 286 is for the proxy server 114 to identify in the storage 224 any appropriate resource data 221 suitable in response to the poll message 127 and to send the suitable resource data 221 to the polling server 116 in a response message 129 to the poll message 127. Otherwise, in the absence of suitable resource data 221 present in the storage 224 upon receipt of the poll message 127, the proxy server 114 could send a null response 129 indicating that no suitable resource data 221 is present for the polling server 116. At stage 288, the polling server 116 sends directly any resource data 221 (received from the proxy server 114) to the appropriate network resource 104 specified as a target of the network resource data 221 for consumption/processing. Alternatively, at stage 288, the polling server 116 sends indirectly via the resource server 118 any resource data 221 (received from the proxy server 114) to the appropriate network resource 104 specified as a target of the network resource data 221 for consumption/processing.

In the above transmission stage 286 of the network resource data 221 to the polling server 116, the subsequent stage transmission 288 to the network resource 104 occurs as a result of the single poll message 127 submitted to the proxy server 114. This procedure of stages 280,282,284,286,288 for getting the network resource data 221 from the network terminal 200 to the network resource 104 can be referred to as single stage polling. Described below is a further embodiment for getting the network resource data 221 from the network terminal 200 to the network resource 104 referred to as two stage (or multi-stage) polling, involving the submission of control data 222 to the proxy server 114 as a result of actions taken by the end user of the network resource data 221 (e.g. the user of the network terminal 200 and/or the recipient of the network resource data 221 once processed by the network resource 104). An example of the recipient of the network resource data 221 being different from the user of the network terminal 200 is where a user of the network terminal 200 is located remotely from the recipient user and the network resource 104, such that the recipient user is local to the network resource 104 and has physical access to the network resource 104. One example of this is where an assistant sends via their computer 200 an email 221 to their boss staying at a hotel for subsequent pickup once printed off at the hotel printer 104.
Multi-Stage Polling Referring to FIG. 8, the concept of providing 2 stage operations in the network system 100 is based on extending the single stage polling 127 mechanism described above for delivering network resource data 221 through the firewall 115, but in this case additional actions and/or requests 222 can be made through the underlying architecture. It is recognised that technical aspects of the multistage polling messages 128 are based on leveraging the proxy server 114 and polling server 116 infrastructure and configured communications over the firewall 115. In that architecture, network resource data 221 is delivered to the proxy server 114 over the network 112 and then subsequently the polling server 116, which pulls the network resource data 221 through the firewall 115 via the polling message 127 initiated by the polling server 116 to the proxy server 115 via ports opened in the firewall 115 for the purpose of establishing/initiating communication and transfer of the network resource data 221 from the proxy server 114 to the polling server 116. The polling server 116 is also configured for delivering the network resource data 221 to physical network resource 104 (e.g. printer) that are also located behind the firewall 115 protecting the polling server 116.

It is recognised that in some cases, the network resource data 221 may be held by the polling server 116 for a period of time until further user interaction (e.g. receipt of the control data 222) occurs to release the network resource data 221 to the network resource 104 or request that the network resource data 221 is deleted. The multi-stage polling mechanism is that these actions, requested by the end user for example, could also occur using the proxy server 114 to deliver the control data 222 to the polling server 116, for use in directing the polling server 116 in how to process (e.g. release the network resource data 221 already held by the polling server 116, wait for coming network resource data 221 and release after receipt by following the release instructions contained in the control data 222, delete any network resource data 221 matching the control data 222 and thereby inhibit the transfer of this network resource data 221 to the network resource 104, etc.

Additional "tasks" for the control data 222, further to releasing and deleting the matched resource data 221, can be updating, amending, substituting or otherwise replacing the resource data 221 or at least a portion of the resource data 221 that was previously sent to the server 114,116 could also apply. For example, the control data 222 could be used to tell the polling server 116 that new print data (resource data 221) is available and should be downloaded to replace the existing print data (resource data 221) already present in the memory of the server 114,116, for example prior to release for consumption by the network resource 104. Also as an extension, the control data 222 could be used to update or otherwise add "meta data" about existing resource data 221. For example, the control data 222 could be used to tell the polling server 116 that the job owner, document name or even the destination network resource 104 (or any other meta data associated with the consumable resource data 221) should be changed prior to release for subsequent consumption by the network resource 104 (this release can also include initial delivery to the enterprise server 118 before ultimate delivery to the network resource 104).

The transfer of control data 222 from the network terminal 200 (for example) to the network resource 104 is also done in stages over the communication network 112. One stage 290 is to transmit the control data 222 from the network terminal 200 to the proxy server 114. Another stage 292 is receipt of the control data 222 by the proxy server 114 and storage of the received control data 222 in the storage 224. Another stage 294 is for the polling server 116 to submit a poll message 128 initiated from inside of the firewall 115 through an opened port in the firewall 115 to the proxy server 114 requesting the availability/presence in the storage 224 of any control data 222 directed to any of the network resources 104 associated with the polling server 116.

Another stage 296 is for the proxy server 114 to identify in the storage 224 any appropriate control data 222 suitable in response to the poll message 128 and to send the suitable control data 222 to the polling server 116 in a response message 130 to the poll message 128. Otherwise, in the absence of suitable control data 222 present in the storage 224 upon receipt of the poll message 129, the proxy server 114 could send a null response 130 indicating that no suitable control data 222 is present for the polling server 116. At stage 298, the polling server 116 processes the control data 222 and can then send directly any control data 222, for example, (received from the proxy server 114) to the appropriate network resource 104 specified as a target of the network resource data 221 for consumption/processing, using the release instructions contained in the control data 222. Alternatively, at stage 298, the polling server 116 processes the control data 222 and can send indirectly via the resource server 118 any resource data 221 (received from the proxy server 114) to the appropriate network resource 104 specified as a target of the network resource data 221 for consumption/processing, using the release instructions contained in the control data 222.

Figure 8:
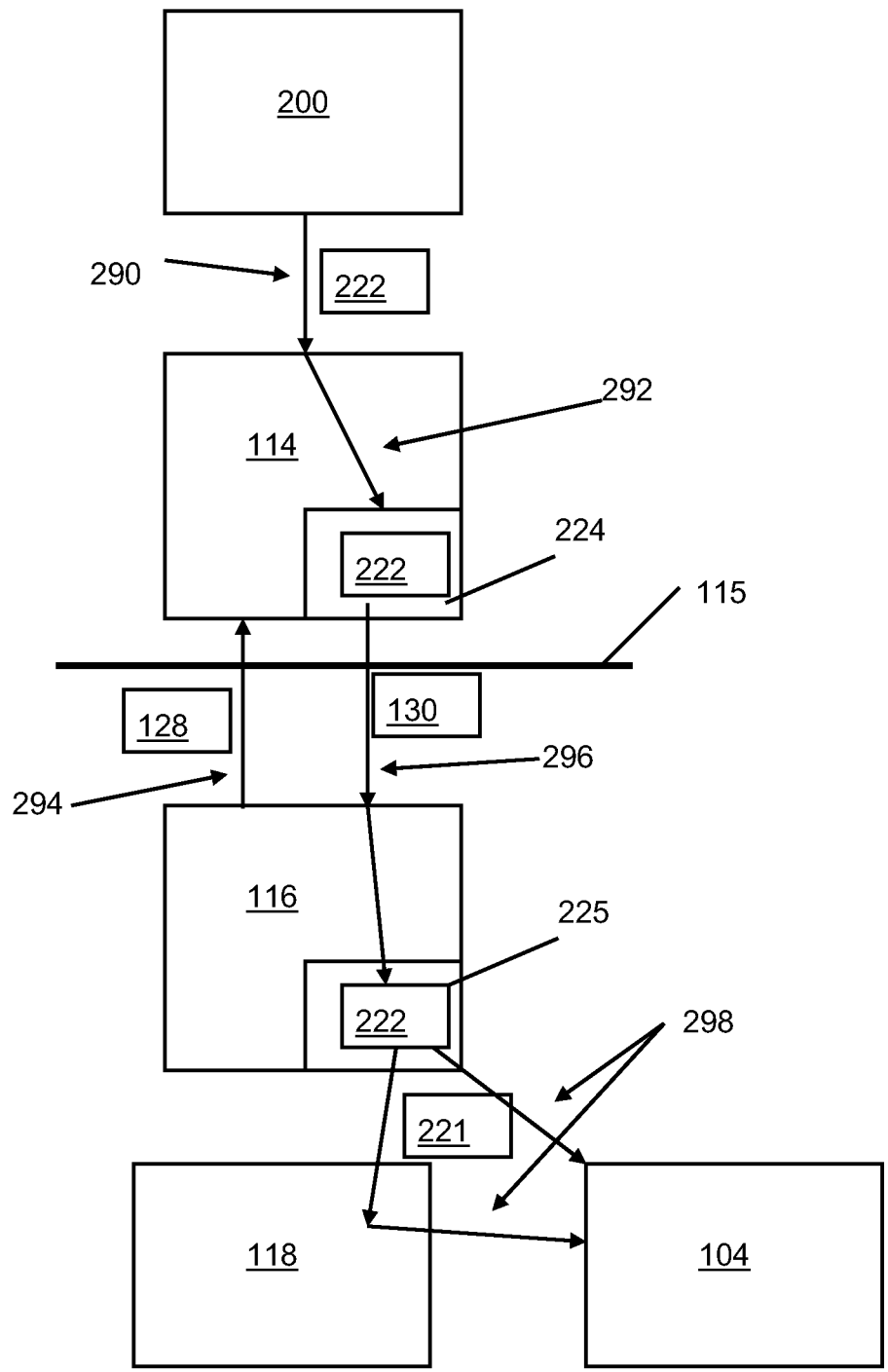
FIG. 8 shows another stage of the multistage polling mechanism of FIG. 6.

Referring to both FIG. 7 and FIG. 8, it is recognised that the operation 284 can occur before operation 294 or that operation 284 can occur after operation 294. The net effect though is that one poll 127 operation 284 is used for obtaining the network resource data 221 and another poll 128 operation 294 is used for obtaining the control data 222 that is associated with the network resource data 221. Further, it is recognised that 280 and 290 can occur sequentially and that operations 284,286 and 294,296 can also occur sequentially. It is the polling server 116 that is configured to obtain the network resource data 221 using the poll message 127 and the control data 222 using the different poll message 128. Once the data 221,222 is resident on the polling server 116 (i.e. obtained through the firewall 115 from the proxy server 114), the polling server 116 is configured to match the data 222 associated with the respective data 221 and then process (e.g. delete, transmit, etc.) the data 222 according to the processing instructions contained in the control data 222. Accordingly, the process of delivering the control data 222 uses the same firewall 115 communication mechanism as delivering the network resource data 221. When the polling server 114 retrieves (via poll message 128 the control data 222, the polling server 114 locates any retrieved network resource data 221 (e.g. retrieved previously) and performs the requested action(s) contained in the control data 222 that is associated with the network resource data 221.

Potential actions contained in the control data 221 can include processing/delivery instructions such as but not limited to: releasing the network resource data 221 (e.g. a print job) to the network resource 104 (e.g. printer) or resource server 118 (e.g. print server); deleting the network resource data 221 which may have been delivered or upon delivery to the polling server 116 (the job may or may not have been actually printed at that point); cancel the network resource data 221 which is pending a release request 128; and/or request the status of the polling server 116 including information/actions such as current job count for jobs (i.e. the network resource data 221) pending release, processed job count for jobs already released, detailed information regarding all/specified jobs stored on the proxy server 114, detailed information regarding a group of jobs sent to a specific network resource 104 destination (the network resource 104 destination can be identified using a globally unique logical identifier assigned to the network resource 104 by the system 26, other statistical usage information of the polling server 116 and/or specific network resources 104, and/or current local configuration(s) of the polling server 116.

Further, it is recognised that when control data 222 is received by the polling server 116, it provides that the polling server 116 takes action on specific network resource data 221 stored in the memory 224, such that the polling server 116 locates the resource data 221 for which the polling request 128 was made. Actions contained in the control data 222 can be taken on specific resource data 221, or groups of resource data 221 with common characteristics stored in the storage 224.

For example, identification/matching of the network resource data 221 with the control data 222 can be accomplished by identification/matching mechanisms such as but not limited to: identifying the network resource data 221 using a globally unique identifier supplied in the control data 222; identifying a set of network resource data 221 which have a given release code as supplied in the control data 222; identify a set of network resource data 221 delivered to a specific resource 104 destination using a given logical device and release code supplied in the control data 222; and/or identify a set of network resource data 221 delivered which contain identifying user information such as account credentials (username/password) or email address or other unique user identifiers associated with the network terminal 200 and/or the target network resource 104 of the network resource data 221. It is recognised that the network resource data 221 and the associated control data 222 contain similar identification data to provide for matching of the separately received data 221,222 (i.e. each according to different polling requests 127,128) by the polling server 116.

Further, it is recognised that access to perform specific requests using control data 222 may be managed using user authentication by the authorization server 110 (or proxy server 114) in interaction with the network terminal 200, for example, where the authenticating information may include: a unique release code; a username/password combination sent with the original network resource data 221; and/or an administrators username/password combination as configured within the proxy server 114. In the event that the control data 22 is submitted to the proxy server 114 without the correct authorization, the proxy server 114 can be configured to delete or otherwise refuse to accept the transmitted control data 222.

Example Operation of the Two-Stage Polling

Figure 9:
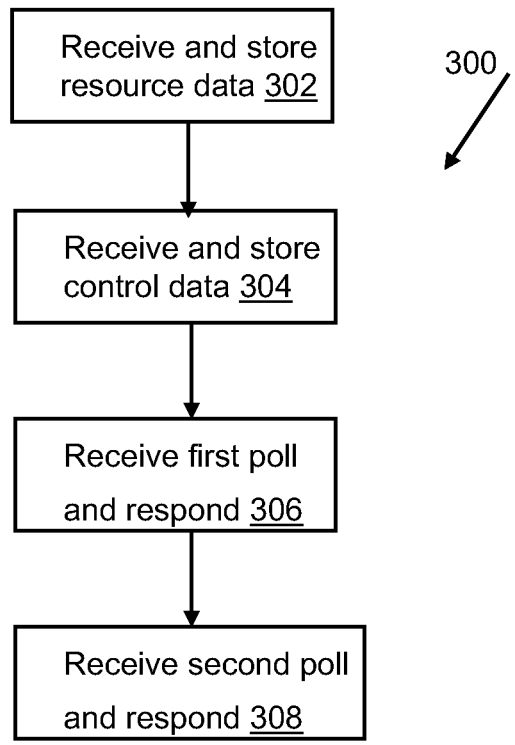
FIG. 9 shows a flowchart of operation of the two-stage polling operation.

Referring to FIG. 9, shown is an example operation 300 of the multi-stage polling operation of the system 100 of FIG. 5 for coordinating submission of network resource data 221 across a first network 112 to a network resource 104 located on a second network 112, the second network 112 being coupled to the first network 112 by a firewall 115 such that the second network 112 has a higher level of trust than that of the first network 112. The operation at step 302 receives and stores in a storage 224 the network resource data 221 submitted by a network terminal 200 coupled to the first network 112, the network resource data 221 containing a network resource identifier for associating the network resource data 221 with the network resource 104. At step 304 is receiving and storing in the storage 224 the control data 222 associated with the network resource data 221, the control data 222 for coordinating one or more actions on the network resource data 221. Step 306 is receiving a first poll message 127 initiated through the firewall 115 by a polling server 116 located on the second network 112, the first poll message 127 requesting stored network resource data 221 containing the network resource identifier and forwarding the network resource data 221 matching the network resource identifier to the polling server 116; and step 308 is receiving a second poll message 128 initiated through the firewall 115 by the polling server 116, the second poll message 128 requesting stored data matching the control data 222 associated with the network resource data 221 and forwarding the matched control data 222 to the polling server 116.

General Server 108,110,114,116,118 Configuration Examples

In view of the above descriptions of storage (e.g. storage 210,224,225) for the servers 108,110,114,116,118, the storage can be configured as keeping the stored data (e.g. data 221,222 and related registry 106 data-records 300) in order and the principal (or only) operations on the stored data are the addition of and removal of the stored data from the storage (e.g. FIFO, FIAO, etc.). For example, the storage can be a linear data structure for containing and subsequent accessing of the stored data and/or can be a non-linear data structure for containing and subsequent accessing of the stored data.

Further, the storage receives various entities such as data that are stored and held to be processed later. In these contexts, the storage can perform the function of a buffer, which is a region of memory used to temporarily hold data while it is being moved from one place to another (i.e. between the servers 114,116 towards the network device 104). Typically, the data is stored in the memory when moving the data between processes within/between one or more computers. It is recognised that the storage can be implemented in hardware, software, or a combination thereof. The storage is used in the network system 100 when there is a difference between the rate/time at which data is received and the rate/time at which the data can be processed (e.g. ultimately by the network resource server 114,116 and/or device 104).

Further, it will be understood by a person skilled in the art that the memory/storage described herein is the place where data can be held in an electromagnetic or optical form for access by the computer processors/modules. There can be two general usages: first, memory is frequently used to mean the devices and data connected to the computer through input/output operations such as hard disk and tape systems and other forms of storage not including computer memory and other in-computer storage. Second, in a more formal usage, memory/storage has been divided into: (1) primary storage, which holds data in memory (sometimes called random access memory or RAM) and other "built-in" devices such as the processor's L1 cache, and (2) secondary storage, which holds data on hard disks, tapes, and other devices requiring input/output operations. Primary storage can be faster to access than secondary storage because of the proximity of the storage to the processor or because of the nature of the storage devices. On the other hand, secondary storage can hold much more data than primary storage. In addition to RAM, primary storage includes read-only memory (ROM) and L1 and L2 cache memory. In addition to hard disks, secondary storage includes a range of device types and technologies, including diskettes, Zip drives, redundant array of independent disks (RAID) systems, and holographic storage. Devices that hold storage are collectively known as storage media.

A database is one embodiment of memory as a collection of information that is organized so that it can easily be accessed, managed, and updated. In one view, databases can be classified according to types of content: bibliographic, full-text, numeric, and images. In computing, databases are sometimes classified according to their organizational approach. The most prevalent approach is the relational database, a tabular database in which data is defined so that it can be reorganized and accessed in a number of different ways. A distributed database is one that can be dispersed or replicated among different points in a network. An object-oriented programming database is one that is congruent with the data defined in object classes and subclasses. Computer databases typically contain aggregations of data records or files, such as sales transactions, product catalogs and inventories, and customer profiles. Typically, a database manager provides users the capabilities of controlling read/write access, specifying report generation, and analyzing usage. Databases and database managers are prevalent in large mainframe systems, but are also present in smaller distributed workstation and midrange systems such as the AS/400 and on personal computers. SQL (Structured Query Language) is a standard language for making interactive queries from and updating a database such as IBM's DB2, Microsoft's Access, and database products from Oracle, Sybase, and Computer Associates.

Memory/storage can also be defined as an electronic holding place for instructions and data that the computer's microprocessor can reach quickly. When the computer is in normal operation, its memory usually contains the main parts of the operating system and some or all of the application programs and related data that are being used. Memory is often used as a shorter synonym for random access memory (RAM). This kind of memory is located on one or more microchips that are physically close to the microprocessor in the computer.

In terms of a server, it is recognised that the server 108, 110,114,116,118 can be configured as hardware, software, or typically a combination of both hardware and software to provide a network entity that operates as a socket listener. It is recognised that any computerised process that shares a resource (e.g. data) to one or more client processes can be classified as a server in the network system 100. The term server can also be generalized to describe a host that is deployed to execute one or more such programs, such that the host can be one or more configured computers that link other computers or electronic devices together via the network 112. The servers 108,110,114,116,118 can provide specialized services across the network 112, for example to private users inside a large organization or to public users via the Internet 112. In the network system 100, the servers can have dedicated functionality and/or can share functionality as described. Enterprise servers are servers that are used in a business context and can be run on/by any capable computer hardware. In the hardware sense, the word server typically designates computer models intended for running software applications under the heavy demand of a network 112 environment. In this client-server configuration one or more machines, either a computer or a computer appliance, share information with each other with one acting as a host for the other. While nearly any personal computer is capable of acting as a network server, a dedicated server will contain features making it more suitable for production environments. These features may include a faster CPU, increased high-performance RAM, and typically more than one large hard drive. More obvious distinctions include marked redundancy in power supplies, network connections, and even the servers themselves.

Example of Server 108,110,114,116, 118 System

Figure 10:
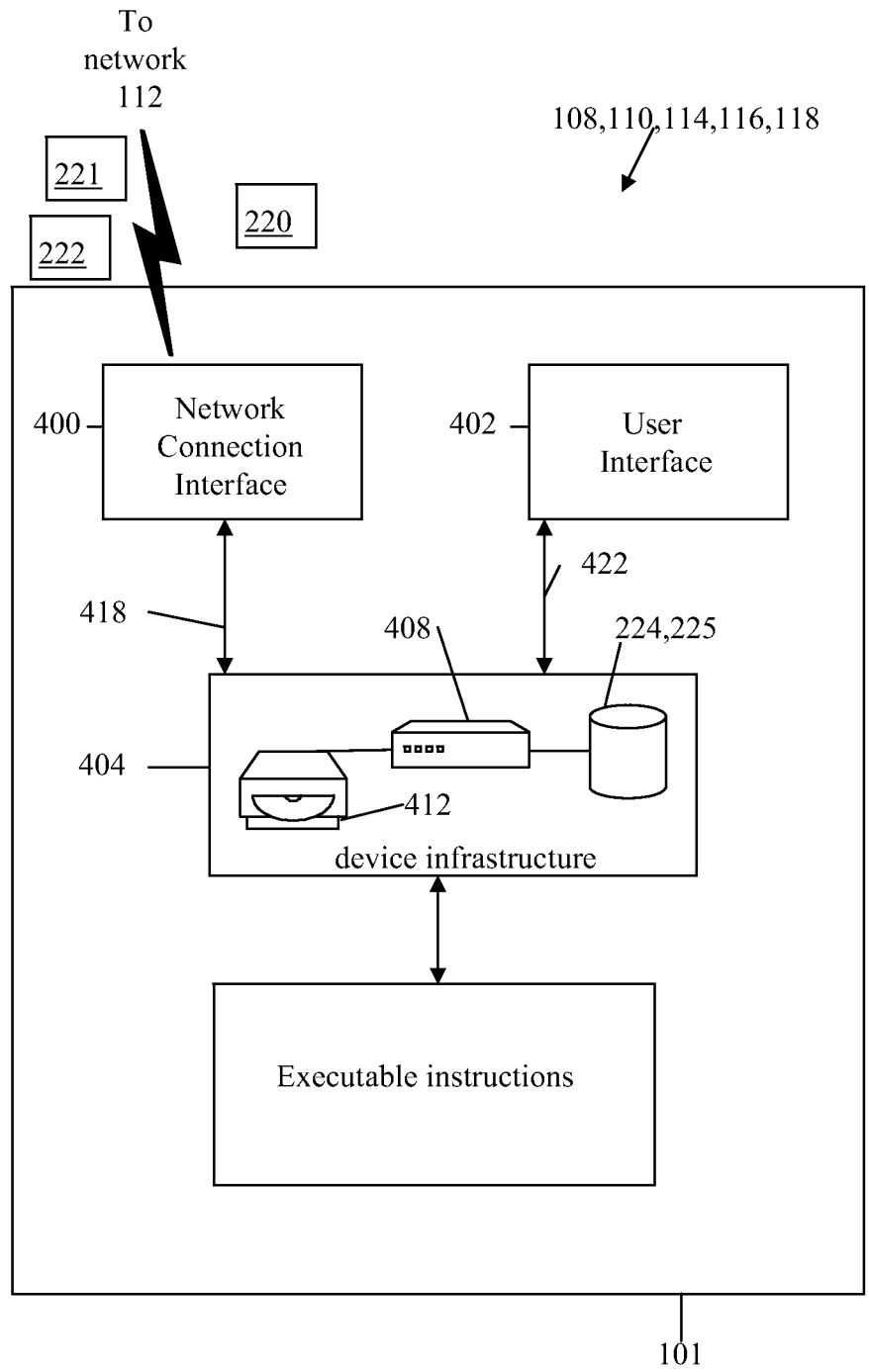
FIG. 10 is an example server configuration of the servers of FIGS. 1 and 5.

Referring to FIG. 10, a computing device 101 of the server 108,110,114,116, 118 can include a network connection interface 400, such as a network interface card or a modem, coupled via connection 418 to a device infrastructure 404. The connection interface 400 is connectable during operation of the devices to the network 112 (e.g. an intranet and/or an extranet such as the Internet), which enables the devices to communicate with each other (e.g. that of servers 114,116 with respect to one another and the devices 104) as appropriate. The network 112 can support the communication of the data 221,222 and communications 220, and the related content.

Referring again to FIG. 10, the device 101 can also have a user interface 402, coupled to the device infrastructure 404 by connection 422, to interact with a user (e.g. server administrator—not shown). The user interface 402 can include one or more user input devices such as but not limited to a QWERTY keyboard, a keypad, a stylus, a mouse, a microphone and the user output device such as an LCD screen display and/or a speaker. If the screen is touch sensitive, then the display can also be used as the user input device as controlled by the device infrastructure 404.

Referring again to FIG. 10, operation of the device 101 is facilitated by the device infrastructure 404. The device infrastructure 404 includes one or more computer processors 408 and can include an associated memory (e.g. a random access memory 224,225). The computer processor 408 facilitates performance of the device 101 configured for the intended task (e.g. of the respective module(s) of the server 114,116) through operation of the network interface 400, the user interface 402 and other application programs/hardware of the device 101 by executing task related instructions. These task related instructions can be provided by an operating system, and/or software applications located in the memory, and/or by operability that is configured into the electronic/digital circuitry of the processor(s) 408 designed to perform the specific task(s). Further, it is recognized that the device infrastructure 404 can include a computer readable storage medium 412 coupled to the processor 408 for providing instructions to the processor 408 and/or to load/update the instructions. The computer readable medium 412 can include hardware and/or software such as, by way of example only, magnetic disks, magnetic tape, optically readable medium such as CD/DVD ROMS, and memory cards. In each case, the computer readable medium 412 may take the form of a small disk, floppy diskette, cassette, hard disk drive, solid-state memory card, or RAM provided in the memory module 412. It should be noted that the above listed example computer readable mediums 412 can be used either alone or in combination.

Further, it is recognized that the computing device 101 can include the executable applications comprising code or machine readable instructions for implementing predetermined functions/operations including those of an operating system and the server 114,116 modules, for example. The processor 408 as used herein is a configured device and/or set of machine-readable instructions for performing operations as described by example above. As used herein, the processor 408 may comprise any one or combination of, hardware, firmware, and/or software. The processor 408 acts upon information by manipulating, analyzing, modifying, converting or transmitting information for use by an executable procedure or an information device, and/or by routing the information with respect to an output device. The processor 408 may use or comprise the capabilities of a controller or microprocessor, for example. Accordingly, any of the functionality of the server 114,116 (e.g. modules) may be implemented in hardware, software or a combination of both. Accordingly, the use of a processor 408 as a device and/or as a set of machine-readable instructions is hereafter referred to generically as a processor/module for sake of simplicity. Further, it is recognised that the server 114,116 can include one or more of the computing devices 101 (comprising hardware and/or software) for implementing the modules, as desired.

It will be understood in view of the above that the computing devices 101 of the servers 114,116 may be, although depicted as a single computer system, may be implemented as a network of computer processors, as desired.

The invention claimed is:

1. A method for coordinating submission of network resource data across a first network to a network resource located on a second network, the second network being coupled to the first network by a firewall such that the second network has a higher level of trust than that of the first network, the method comprising the steps of:
receiving and storing in a storage the network resource data submitted by a network terminal coupled to the first network, the network resource data containing a network resource identifier for associating the network resource data with the network resource;
receiving and storing in the storage control data associated with the network resource data, the control data coordinating one or more actions on the network resource data by the polling server prior to release of the network resource data by the polling server to produce processed network resource data, the processed network resource data for consumption by the network resource;
receiving a first poll message from the second network through the firewall to the first network as initiated by a polling server located on the second network, the first poll message requesting any network resource data containing the network resource identifier, retrieving the network resource data from the storage matching the network resource identifier and forwarding the network resource data to the polling server in response to the first poll message; and
receiving a second poll message from the second network through the firewall to the first network as initiated by the polling server, the second poll message requesting any control data associated with the network resource data, retrieving the control data from the storage matching the network resource data and forwarding the control data to the polling server in response to the second poll message distributing the network resource data, by using an enterprise server located on the second network between the polling server and the network resource, once released, to the network resource, wherein the enterprise server is a print server, the network resource data is print data, and the network resource is a printer.

2. The method of claim 1, wherein the one or more actions of the control data include releasing by the polling server the network resource data to the network resource identified by the network resource identifier.

3. The method of claim 2 further comprising the step of distributing the network resource data, once released, to the network resource via an enterprise server located on the second network between the polling server and the network resource.

4. The method of claim 1, wherein the one or more actions of the control data include deleting the network resource data prior to delivery to the network resource identified by the network resource identifier.

5. The method of claim 1, wherein the one or more actions of the matched control data include requesting the status of the polling server.

6. The method of claim 1, wherein the first poll message is received before the second poll message.

7. The method of claim 1, wherein the first poll message is received after the second poll message.

8. The method of claim 1, wherein the first poll message is received at the same time as the second poll message.

9. The method of claim 1, wherein the network resource data is forwarded before the control data.

10. The method of claim 1, wherein the network resource data is forwarded after the control data.

11. The method of claim 1, wherein the network resource data is forwarded at the same time as the control data.

12. A method for coordinating submission of network resource data across a first network to a network resource located on a second network, the second network being coupled to the first network by a firewall such that the second network has a higher level of trust than that of the first network, the method comprising the steps of:

submitting a first poll message from the second network through the firewall as initiated by a polling server located on the second network to a proxy server located on the first network, the first poll message requesting any network resource data containing a network resource identifier, the network resource identifier for associating the network resource data with the network resource;

receiving the network resource data by the polling server from the proxy server in response to the first poll message;

submitting a second poll message from the second network through the firewall as initiated by the polling server to the proxy server, the second poll message requesting any control data associated with the network resource data, the control data for coordinating one or more actions on the network resource data by the polling server to produce processed network resource data, the processed network resource data for consumption by the network resource;

receiving the control data by the polling server from the proxy server in response to the second poll message; and prior to release of the processed network resource data by the polling server, processing the network resource data according to the one or more actions defined by the control data to produce the processed network resource data distributing the network resource data, by using an enterprise server located on the second network between the polling server and the network resource, once released, to the network resource, wherein the enterprise server is a print server, the network resource data is print data, and the network resource is a printer.

13. The method of claim 12, wherein the matching network resource data is received before the matching control data.

14. The method of claim 12, wherein the network resource data is received after the control data.

15. The method of claim 12, wherein the network resource data is received at the same time as the control data.

16. A system for coordinating submission of network resource data across a first network to a network resource located on a second network, the second network being coupled to the first network by a firewall such that the second network has a higher level of trust than that of the first network, the system comprising:

a proxy server located on the first network and configured for receiving and storing in a storage the network resource data submitted by a network terminal, the network resource data containing a network resource identifier for associating the network resource data with the network resource;

a polling server located on the second network and coupled to the proxy server via the firewall, the polling server configured for initiating and submitting a first poll message through the firewall to the proxy server requesting any network resource data containing the network resource identifier and for receiving the network resource data from the proxy server in response to the first poll message, and the polling server is further configured for initiating and submitting a second poll message through the firewall to the proxy server requesting any control data associated with the network resource data and for receiving the control data from the proxy server and processing the network resource data according to the one or more actions contained in the control data to produce the processed network resource data prior to release of the processed network resource data by the polling server, wherein the proxy server is further configured for receiving and storing in the storage control data associated with the network resource data, the control data for coordinating one or more actions on the network resource data at the polling server to produce processed network resource data, the processed network resource data for consumption by the network resource an enterprise server located on the second network between the polling server and the network resource, the enterprise server configured for distributing the network resource data, once released, to the network resource, wherein the enterprise server is a print server, the network resource data is print data, and the network resource is a printer.

17. The system of claim 16, wherein the first network is an extranet and the second network is an intranet.

18. The system of claim 16, wherein the first network is an intermediate network between an extranet and the second network, such that the network terminal is coupled to the extranet.

19. The system of claim 16, wherein the one or more actions of the control data include amending the network resource data prior to the release.

20. The system of claim 16, wherein the one or more actions of the control data include amending metadata associated with the network resource data prior to the release.

* * * * *